US011764832B2

(12) United States Patent
Chen et al.

(10) Patent No.: US 11,764,832 B2
(45) Date of Patent: Sep. 19, 2023

(54) SYSTEMS, METHODS, AND MEDIA FOR WIRELESS POWER TRANSFER

(71) Applicants: University of Maryland, College Park, College Park, MD (US); Wesleyan University, Middletown, CT (US)

(72) Inventors: Lei Chen, College Park, MD (US); Steven Mark Anlage, Laurel, MD (US); Tsampikos Kottos, Middletown, CT (US)

(73) Assignees: UNIVERSITY OF MARYLAND, COLLEGE PARK, College Park, MD (US); WESLEYAN UNIVERSITY, Middletown, CT (US)

( * ) Notice: Subject to any disclaimer, the term of this patent is extended or adjusted under 35 U.S.C. 154(b) by 0 days.

(21) Appl. No.: 17/550,915

(22) Filed: Dec. 14, 2021

(65) Prior Publication Data

US 2022/0190877 A1 Jun. 16, 2022

Related U.S. Application Data

(60) Provisional application No. 63/125,378, filed on Dec. 14, 2020.

(51) Int. Cl.
*H04B 5/00* (2006.01)
*H02J 50/10* (2016.01)
*H02J 50/20* (2016.01)

(52) U.S. Cl.
CPC ............ *H04B 5/0037* (2013.01); *H02J 50/10* (2016.02); *H02J 50/20* (2016.02)

(58) Field of Classification Search
CPC .......... H04B 5/0037; H02J 50/10; H02J 50/20
See application file for complete search history.

(56) References Cited

U.S. PATENT DOCUMENTS 9,424,665 B1 8/2016 Frazier et al.
9,985,465 B1 * 5/2018 Glover .................... H02J 50/20
(Continued)

OTHER PUBLICATIONS

Baranov et al., Coherent Perfect Absorbers: Linear Control of Light with Light, Nature Reviews Materials, 2017, vol. 2, Article 17064, pp. 1-14.

(Continued)

*Primary Examiner* — Jared Fureman
*Assistant Examiner* — Michael J Warmflash
(74) *Attorney, Agent, or Firm* — QUARLES & BRADY LLP

(57) ABSTRACT

Systems, methods, and media for wireless power transfer are provided. In some embodiments, a system for wireless power transfer comprises: a processor communicatively coupled with a tuning element and a plurality of ports in an enclosure, the processor configured to cause the ports to generate electromagnetic radiation at a first frequency, set the tuning element to a first setting, acquire electromagnetic response from the ports, determine an S-matrix using the electromagnetic response, determine an eigenvalue of the S-matrix, repeat these steps (changing the first frequency and/or first setting) at least until the determined eigenvalue is approximately zero, determine a resolved electromagnetic radiation frequency and a resolved tuning element setting having the approximately zero eigenvalue, determine an eigenvector associated with the resolved electromagnetic radiation frequency and resolved tuning element setting, and cause the ports to generate the electromagnetic radiation at the resolved frequency with phase and amplitude determined from the eigenvector.

20 Claims, 11 Drawing Sheets

(56) References Cited

U.S. PATENT DOCUMENTS

| | | | |
|---|---|---|---|
| 10,396,602 | B2 | 8/2019 | Zeine |
| 10,566,846 | B2 | 2/2020 | Zeine |
| 11,101,915 | B2 | 8/2021 | Anlage et al. |
| 2018/0269715 | A1* | 9/2018 | Hannigan ............... H02J 50/10 |
| 2018/0323657 | A1* | 11/2018 | Hannigan ............... H02J 50/90 |
| 2020/0067341 | A1* | 2/2020 | Glover .................... H02J 50/20 |
| 2021/0249912 | A1* | 8/2021 | Glover .................... H02J 50/30 |

OTHER PUBLICATIONS

Bialous et al., Power Spectrum Analysis and Missing Level Statistics of Microwave Graphs with Violated Time Reversal Invariance, arXiv:1609.06073, Sep. 20, 2016, 6 pages.
Cangialosi et al., Time Reversed Electromagnetic Wave Propagation as a Novel Method of Wireless Power Transfer, 2016 IEEE Wireless Power Transfer Conference (WPTC), 2016, pp. 1-4.
Chen et al., Exceptional Points Enhance Sensing in an Optical Microcavity, Nature, 2017, 548:192-196.
Chong et al., Coherent Perfect Absorbers: Time-Reversed Lasers, Physical Review Letters, 2010, 105(5):053901, 4 pages.
Dietz et al., Spectral Properties of Bunimovich Mushroom Billiards, arXiv:nlin/0703024, Mar. 13, 2007, 4 pages.
Dietz et al., Non-Universality in the Spectral Properties of Time-Reversal Invariant Microwave Networks and Quantum Graphs, arXiv:1704.05049, Apr. 15, 2017, 9 pages.
Dutta-Gupta et al., Controllable Coherent Perfect Absorption in a Composite Film, Optics Express, 2012, 20 (2):1330-1336.
Dutta-Gupta et al., Coherent Perfect Absorption Mediated Anomalous Reflection and Refraction, Optics Letters, 2012, 37(21):4452-4454.
Frazier et al., Wavefront Shaping with a Tunable Metasurface: Creating Cold Spots and Coherent Perfect Absorption at Arbitrary Frequencies, Physical Review Research, 2020, 2(4):043422, 15 pages.
Fu, A Wave Chaotic Study of Quantum Graphs with Microwave Networks, Master's Thesis, University of Maryland, 2017, 69 pages.
Fu et al., Experimental Study of Quantum Graphs with Simple Microwave Networks: Non-Universal Features, Acta Physica Polonica A, 2017, 132(6):1655-1660.
Fyodorov et al., Distribution of Zeros of the S-matrix of Chaotic Cavities with Localized Losses and Coherent Perfect Absorption: Non-Perturbative Results, Journal of Physics A: Mathematical and Theoretical, 2017, 50:30LT01, pp. 1-11.
Fyodorov et al., Parametric Correlations of Scattering Phase Shifts and Fluctuations of Delay Times in Few- Channel Chaotic Scattering, arXiv:cond-mat/9601046, Apr. 19, 1996, pp. 1-4.
Gnutzmann et al., Universal Spectral Statistics in Quantum Graphs, arXiv:nlin/0402029, Sep. 27, 2004, 4 pages.
Gnutzmann et al., Quantum Graphs: Applications to Quantum Chaos and Universal Spectral Statistics, arXiv: hlim/0605028, Dec. 15, 2006, 142 pages.
Gnutzmann et al., Quantum Ergodicity on Graphs, arXiv:0808.4110, Aug. 29, 2008, 4 pages.
Hart et al., Effect of Short Ray Trajectories on the Scattering Statistics of Wave Chaotic Systems, Physical Review E, 2009, 80:041109, pp. 1-15.
He et al., Tunable/Reconfigurable Metasurfaces: Physics and Applications, AAAS Research, vol. 2019, Article ID 1849272, 16 pages.
Hemmady et al., Universal Impedance Fluctuations in Wave Chaotic Systems, Physical Review Letters, 2005, 94:014102, 4 pages.
Hemmady et al., Experimental Test of Universal Conductance Fluctuations by Means of Wave-Chaotic Microwave Cavities, Physical Review B, 2006, 74:195326, 6 pages.
Hemmady et al., Universal Properties of Two-Port Scattering, Impedance, and Admittance Matrices of Wave-Chaotic Systems, Physical Review E, 2006, 74:036213, 12 pages.
Hul et al., Experimental Simulation of Quantum Graphs by Microwave Networks, arXiv:nlin/0404006, Apr. 2, 2004, 23 pages.
Hul et al., Experimental Investigation of Wigner's Reaction Matrix for Irregular Graphs with Absorption, Journal of Physics A: Mathematical and General, 2005, 38:10489-10496.
Hul et al., Investigation of Parameter-Dependent Properties of Quantum Graphs With and Without Time-Reversal Symmetry, Physica Scripta, 2009, T135:014048, pp. 1-5.
Hul et al., Are Scattering Properties of Graphs Uniquely Connected to Their Shapes?, arXiv:1207.6221, Jul. 26, 2012, 10 pages.
Kang et al., Polarization-Independent Coherent Perfect Absorption by a Dipole-Like Metasurface, Optics Letters, 2013, 38(16):3086-3088.
Kottos et al., Quantum Chaos on Graphs, Physical Review Letters, 1997, 79(24):4794-4797.
Kottos et al., Chaotic Scattering on Graphs, Physical Review Letters, 2000, 85(5):968-971.
Kottos et al., Statistical Properties of Resonance Widths for Open Quantum Graphs, arXiv:nlin/0301021, Jan. 18, 2003, 17 pages.
Krasnok et al., Coherently Enhanced Wireless Power Transfer, Physical Review Letters, 2018, 120:143901, 5 pages.
Kuipers et al., Efficient Semiclassical Approach for Time Delays, New Journal of Physics, 2014, 16:123018, pp. 1-50.
Lanoy et al., Broadband Coherent Perfect Absorption of Acoustic Waves with Bubble Meta-Screens, Applied Physics Letters, 2018, 113:171907, 5 pages.
Lawniczak et al., Investigation of the Diagonal Elements of the Wigner's Reaction Matrix for Networks with Violated Time Reversal Invariance, Scientific Reports, 2019, 9:5630, pp. 1-10.
Li et al., Broadband Perfect Absorption of Ultrathin Conductive Films with Coherent Illumination: Super Performance of Electro Magnetic Absorption, Physical Review B, 2015, 91:220301, 27 pages.
Li et al., Random Matrix Theory Approach to Chaotic Coherent Perfect Absorbers, Physical Review Letters, 2017, 118 (4):044101, 6 pages.
Li et al., Statistical Design of Chaotic Waveforms with Enhanced Targeting Capabilities, Physical Review B, 2018, 98:041107, pp. 1-6.
Ma et al., Wave Scattering Properties of Multiple Weakly Coupled Complex Systems, Physical Review E, 2020, 101:022201, 12 pages.
Meng et al., Acoustic Coherent Perfect Absorbers as Sensitive Null Detectors, Scientific Reports, 2017, 7:43574, pp. 1-8.
Mullers et al., Coherent Perfect Absorption of Nonlinear Matter Waves, Science Advances, 2018, 4:eaat6539, pp. 1-6.
Osman et al., Chaotic Scattering with Localized Losses: S-Matrix Zeros and Reflection Time Difference for Systems with Broken Time Reversal Invariance, arXiv:2004.14833, Apr. 30, 2020, pp. 1-13.
Pichler et al., Random Anti-Lasing Through Coherent Perfect Absorption in a Disordered Medium, Nature, 2019, 667(7748):351-355.
Pluhar et al., Universal Chaotic Scattering on Quantum Graphs, arXiv:1210.0720, Feb. 5, 2013, 5 pages.
Pluhar et al., Universal Quantum Graphs, arXiv:1312.2349, Dec. 9, 2013, 5 pages.
Rao et al., Coherent Control of Light Interaction with Graphene, Optics Letters, 2014, 39(18):5345-5347.
Rehemanjiang et al., Microwave Realization of the Gaussian Symplectic Ensemble, Physical Review Letters, 2016, 117:064101, pp. 1-5.
Richter et al., Semiclassical Theory of Chaotic Quantum Transport, Physical Review Letters, 2002, 89(20):206801, 4 pages.
Schanz et al., Scars on Quantum Networks Ignore the Lyapunov Exponent, Physical Review Letters, 2003, 90 (23):234101, 4 pages.
Schindler et al., PT-symmetric Electronics, Journal of Physics A: Mathematical and Theoretical, 2012, 45:444029, pp. 1-15.
Seba et al., Statistical Properties of Random Scattering Matrices, Physical Review E, 1996, 54(3):2438-2446.
Wan et al., Time-Reversed Lasing and Interferometric Control of Absorption, Science, 2011, 331:889-892.
Wong et al., Lasing and Anti-Lasing in a Single Cavity, Nature Photonics, 2016, 10:796, pp. 1-6.
Wu et al., Probability Amplitude Fluctuations in Experimental Wave Chaotic Eigenmodes With and Without Time-Reversal Symmetry, Physical Review Letters, 1998, 81(14):2890-2893.

(56) References Cited

OTHER PUBLICATIONS

Yoon et al., Measurement and Modeling of a Complete Optical Absorption and Scattering by Coherent Surface Plasmon-Polariton Excitation Using a Silver Thin-Film Grating, Physical Review Letters, 2012, 109:257402, 5 pages.

Zhang, J. et al., Controlling Light-With-Light Without Nonlinearity, Light: Science & Applications, 2012, 1, e18, pp. 1-5.

Zhang et al., Coherent Perfect Absorption and Transparency in a Nanostructured Graphene Film, Optics Express, 2014, 22(10):12524-12532.

Frazier et al., Deep-learning estimation of complex reverberant wave fields with a programmable metasurface, Physical Review Applied 17.2 (2022): 024027.31 pages.

Ławiniczak et a., "Experimental investigation of the enhancement factor for microwave irregular networks with preserved and broken time reversal symmetry in the presence of absorption." Physical Review E 81.4 (2010): 046204. 5 pages.

Muller et al., "The Oxford Handbook of Random Matrix Theory" (Oxford Handbooks), (Oxford: Oxford University Press, 2011) edited by G. Akemann, J. Baik, and P. Di Francesco. Book, Table of Contents Provided, 18 pages.

Zhu et al., "Coherent perfect absorption in an all-dielectric metasurface." Applied Physics Letters 108.12 (2016): 121901. 5 pages.

Kowal et al., "Transmission through multiply-connected wire systems." Physical Review B 42.14 (1990): 9009-9018.

Haake et al., "Quantum Signatures of Chaos" (Springer Series in Synergetics) 4th ed. 2018 Edition. Book, Table of Contents Provided, 13 pages.

Casati et al., "Connection between quantization of nonintegrable systems and statistical theory of spectra." Lett. Nuovo Cimento;(Italy) 28.8 (1980). 279-282.

Bohigas et al., "Characterization of chaotic quantum spectra and universality of level fluctuation laws." Physical review letters 52.1 (1984): 1. 6 pages.

So et al., "Wave chaos experiments with and without time reversal symmetry: GUE and GOE statistics." Physical review letters 74.14 (1995): 2662-2665.

Brahim et al.,"Experiments of time-reversed pulse waves for wireless power transmission in an indoor environment." IEEE Transactions on Microwave Theory and Techniques 64.7 (2016): 2159-2170.

\* cited by examiner

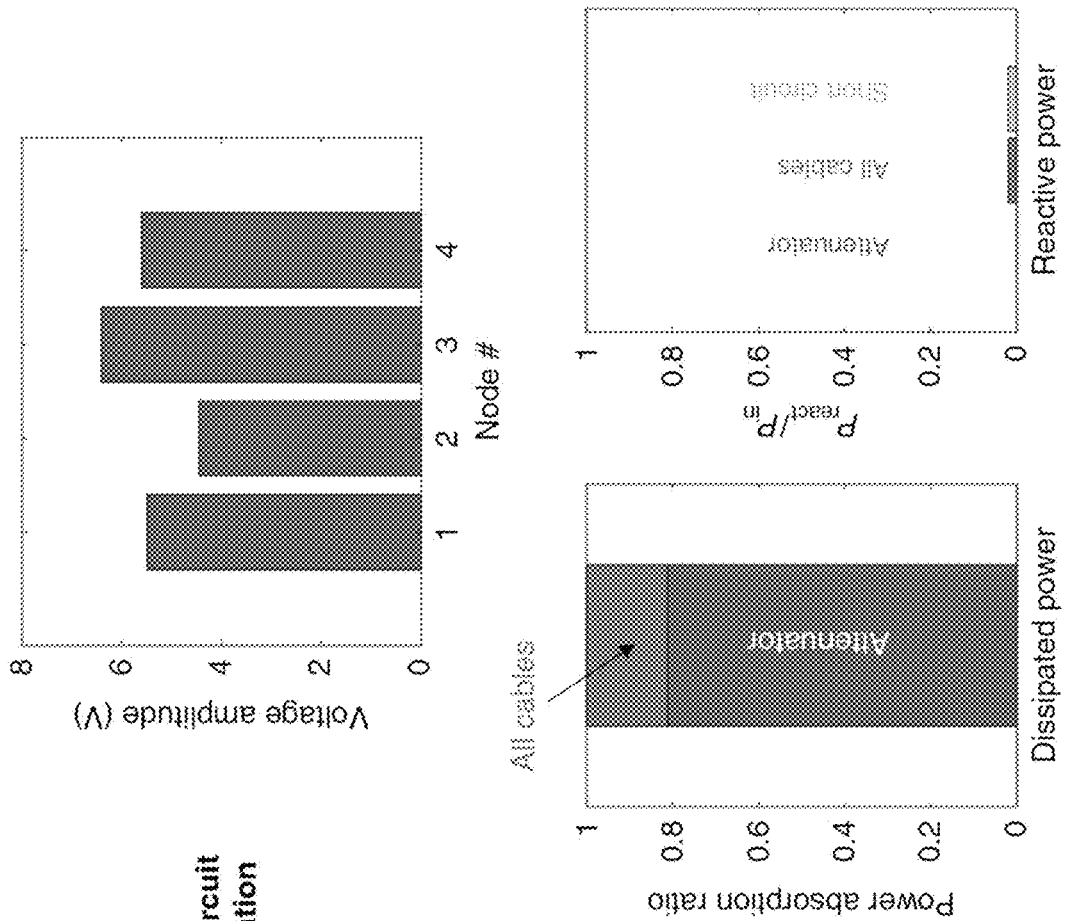
FIG. 9B
FIG. 9C
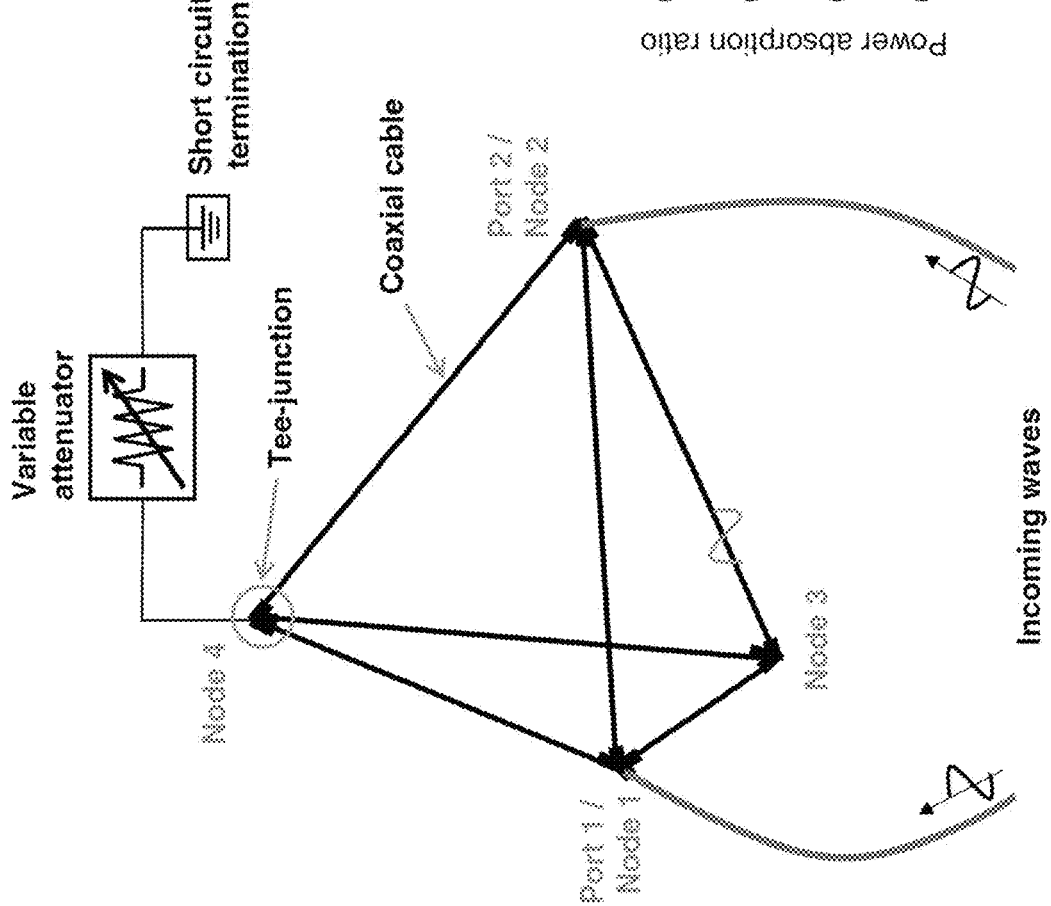
FIG. 9A

SYSTEMS, METHODS, AND MEDIA FOR WIRELESS POWER TRANSFER

CROSS-REFERENCE TO RELATED APPLICATION(S)

This application is based on, claims the benefit of, and claims priority to U.S. Provisional Application No. 63/125,378, filed Dec. 14, 2020, which is hereby incorporated herein by reference in its entirety for all purposes.

STATEMENT REGARDING FEDERALLY SPONSORED RESEARCH

This invention was made with government support under N000141912481 and N000141912480 awarded by the Office of Naval Research, and FA95501510171 awarded by the Air Force Office of Scientific Research. The government has certain rights in the invention.

BACKGROUND

Wireless power transfer may be used to transmit electrical energy to a target without wires as a physical link. Close-range (such as within one wavelength) wireless power transfer may be accomplished, for example, via close-range inductive coupling. Long-range (i.e. other than close-range) wireless power transfer via electromagnetic waves is also desired. However, when targets are located within complicated enclosures, such as complex networks, buildings, or vessels, the hypersensitive nature of chaotic scattering of the electromagnetic waves in the enclosure challenges the viability of long-range wireless power transfer schemes. Accordingly, improved systems, methods, and media for long-range wireless power transfer in complex ray-chaotic environments are desirable.

SUMMARY

In accordance with some embodiments of the disclosed subject matter, systems, methods, and media for wireless power transfer are provided.

In accordance with some embodiments of the disclosed subject matter, a device for wireless power transfer to a target in an enclosure, the enclosure having a tuning element and plurality of ports located therein, is provided, the device comprising a processor communicatively coupled with the tuning element and plurality of ports and configured to: (a) cause the ports to generate an electromagnetic radiation at a first frequency; (b) set the tuning element to a first setting; (c) acquire an electromagnetic response from the plurality of ports; (d) determine an S-matrix using the acquired electromagnetic response; (e) determine an eigenvalue of the S-matrix; (f) repeat (a) to (e) at least until the determined eigenvalue is approximately zero, wherein repeating (a) to (e) comprises changing at least one of the first frequency or first setting; (g) determine a resolved electromagnetic radiation frequency and a resolved tuning element setting having the approximately zero eigenvalue; (h) determine an eigenvector associated with the resolved electromagnetic radiation frequency and a resolved tuning element setting; and (i) cause the ports to generate the electromagnetic radiation at the resolved frequency with a phase and an amplitude determined from the eigenvector.

In some embodiments, the electromagnetic radiation generated by the ports comprises microwave.

In some embodiments, the processor is further configured to repeat (a) to (i) at a regular interval.

In some embodiments, the processor is further configured to: determine a received amount of electromagnetic radiation after setting the tuning element to the resolved tuning element setting and causing the ports to generate the electromagnetic radiation at the resolved frequency; and repeat (a) to (i) upon a condition wherein the received amount of electromagnetic radiation is greater than a threshold.

In some embodiments, the tuning element comprises a reconfigurable metasurface.

In some embodiments, the target comprises an antenna configured to receive the electromagnetic radiation; and the target is configured to convert the received electromagnetic radiation into electrical current.

In some embodiments, the tuning element comprises a tunable lossy element coupled with the antenna.

In some embodiments, the target comprises a tuning element and the processor is configured to: communicatively couple with the target; and provide the first setting to the target.

In accordance with some embodiments of the disclosed subject matter, a method for wireless power transfer to a target in an enclosure, the enclosure having a tuning element and plurality of ports located therein, is provided, the method comprising: (a) causing the ports to generate an electromagnetic radiation at a first frequency; (b) setting the tuning element to a first setting; (c) acquiring an electromagnetic response from the plurality of ports; (d) determining an S-matrix using the acquired electromagnetic response; (e) determining an eigenvalue of the S-matrix; (f) repeating (a) to (e) at least until the determined eigenvalue is approximately zero, wherein repeating (a) to (e) comprises changing at least one of the first frequency or first setting; (g) determining a resolved electromagnetic radiation frequency and a resolved tuning element setting having the approximately zero eigenvalue; (h) determining an eigenvector associated with the resolved electromagnetic radiation frequency and a resolved tuning element setting; and (i) causing the ports to generate the electromagnetic radiation at the resolved frequency with a phase and an amplitude determined from the eigenvector.

In some embodiments, the method further comprises repeats (a) to (i) at a regular interval.

In some embodiments, the method further comprises: determining a received amount of electromagnetic radiation after setting the tuning element to the resolved tuning element setting and causing the ports to generate the electromagnetic radiation at the resolved frequency; and repeating (a) to (i) upon a condition wherein the received amount of electromagnetic radiation is greater than a threshold.

In some embodiments, the target comprises the tuning element, and the method further comprises: communicatively coupling with the target; and providing the first setting to the target.

In accordance with some embodiments of the disclosed subject matter, a non-transitory computer-readable medium containing computer executable instructions that, when executed by a processor, cause the processor to perform a method for wireless power transfer to a target in an enclosure having a tuning element and a plurality of ports located therein, is provide, the method comprising: (a) causing the ports to generate an electromagnetic radiation at a first frequency; (b) setting the tuning element to a first setting; (c) acquiring an electromagnetic response from the plurality of ports; (d) determining an S-matrix using the acquired electromagnetic response; (e) determining an eigenvalue of the S-matrix; (f) repeating (a) to (e) at least until the determined eigenvalue is approximately zero, wherein repeating (a) to (e) comprises changing at least one of the first frequency or first setting; (g) determining a resolved electromagnetic radiation frequency and a resolved tuning element setting having the approximately zero eigenvalue; (h) determining an eigenvector associated with the resolved electromagnetic radiation frequency and a resolved tuning element setting; and (i) causing the ports to generate the electromagnetic radiation at the resolved frequency with a phase and an amplitude determined from the eigenvector.

In some embodiments, the instructions further cause the processor to repeat (a) to (i) at a regular interval.

In some embodiments, the instructions further cause the processor to determine a received amount of electromagnetic radiation after setting the tuning element to the resolved tuning element setting and causing the ports to generate the electromagnetic radiation at the resolved frequency; and repeat (a) to (i) upon a condition wherein the received amount of electromagnetic radiation is greater than a threshold.

In some embodiments, the target comprises the tuning element, and the instructions further cause the processor to communicatively couple with the target; and provide the first setting to the target.

In accordance with some embodiments of the disclosed subject matter, a device for wireless power transfer to a target in an enclosure, the enclosure having a tuning element and plurality of ports located therein, is provided, the device comprising a means for: (a) causing the ports to generate an electromagnetic radiation at a first frequency; (b) setting the tuning element to a first setting; (c) acquiring an electromagnetic response from the plurality of ports; (d) determining an S-matrix using the acquired electromagnetic response; (e) determining an eigenvalue of the S-matrix; (f) repeating (a) to (e) at least until the determined eigenvalue is approximately zero, wherein repeating (a) to (e) comprises changing at least one of the first frequency or first setting; (g) determining a resolved electromagnetic radiation frequency and a resolved tuning element setting having the approximately zero eigenvalue; (h) determining an eigenvector associated with the resolved electromagnetic radiation frequency and a resolved tuning element setting; and (i) causing the ports to generate the electromagnetic radiation at the resolved frequency with a phase and an amplitude determined from the eigenvector.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 9A shows a schematic representation of the simulated system for demonstrating the viability of long-range wireless power transfer in complex ray-chaotic environments implemented in accordance with some embodiments of the disclosed subject matter.

FIG. 9B shows measurements of voltage at various points in the simulated system.

FIG. 9C shows measurements of power absorption and reactive power in various portions of the simulated system.

DETAILED DESCRIPTION

Figure 1:
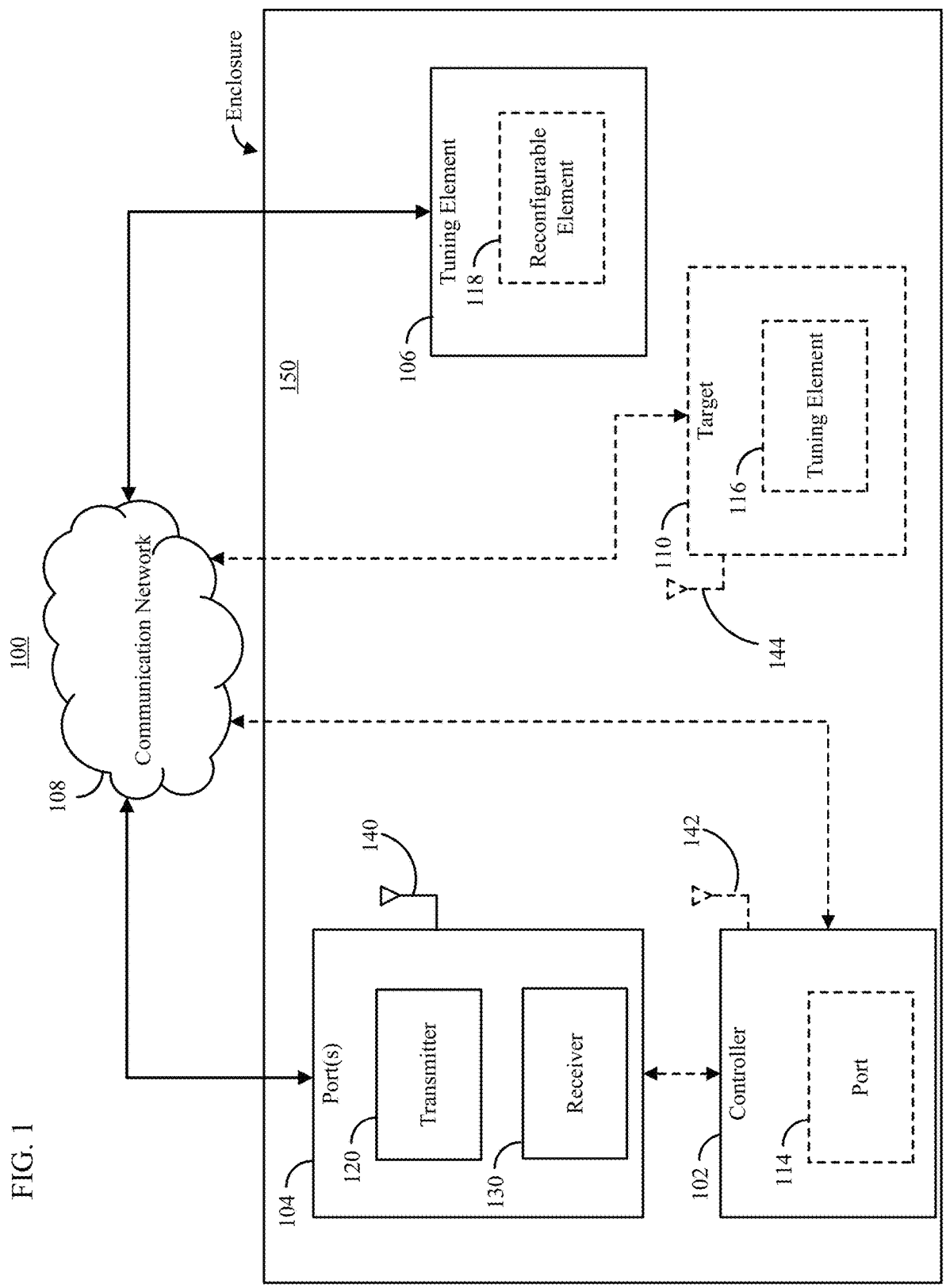
FIG. 1 shows an example of a system for wireless power transfer in accordance with some embodiments of the disclosed subject matter.

In accordance with some embodiments of the disclosed subject matter, mechanisms (which can include systems, methods and/or media) for wireless power transfer are provided.

In some embodiments, the mechanisms disclosed herein can be used to implement long-range wireless power transfer while achieving a high power transfer ratio with limited resources required. In some embodiments, mechanisms described herein may utilize Coherent Perfect Absorption (CPA) for power transfer. In some embodiments, mechanisms described herein may utilize an anti-CPA channel leveraging the anti-CPA eigenvector at the same frequency. In such embodiments, a system implemented in accordance with mechanisms described herein may facilitate simultaneous and interference-free power transfer and communication at the same operational frequency. In some embodiments, a system implemented in accordance with the mechanisms described herein can facilitate power transfer and communication simultaneously. In some embodiments, the power transfer and communication may take place independently and simultaneously without interfering with one another.

Many realizations of enclosed spaces are ray-chaotic or may be approximated as ray-chaotic. The enclosed space may be filled with homogeneous radiation. The mechanisms described herein may facilitate sending wave energy from one or more ports to one or more targets to be powered, located at arbitrary points inside an enclosure, with increased efficiency. The mechanisms may establish a condition of Coherent Perfect Absorption (CPA) in the enclosure.

CPA was conceived of as a time-reversed laser and relied on time-reversal invariance for wave propagation. Nearly all realizations of systems that utilize CPA have followed this basic paradigm and have utilized structures or coherent illumination conditions with very special symmetries. Reverberations, complex interference, and losses present in wave- or quantum-chaotic systems constitute a challenge for achieving CPA. The mechanisms described herein, however, allow for the realization of CPA without time-reversal symmetry. For example, the CPA may be associated with violated time-reversal symmetry. The mechanisms described herein provide improvement beyond the initial concept of CPA.

The mechanisms described herein may achieve CPA by measuring the N×N scattering matrix S of the system, where N is the number of ports, and tuning the scattering properties of the system to create a zero complex eigenvalue of the scattering matrix, $\lambda_s$. Under this condition there will be complete absorption of energy injected into the enclosure when excited with the corresponding eigenvector.

Having a plurality of nominally identical objects to be powered may be further advantageous to the mechanisms described herein. In some embodiments, the ergodic nature of the eigenmodes of the enclosure 150 can be relied on to develop a statistical description of the incident wavefronts that can be used to deliver their carrying energy to the nominally identical objects. In some other embodiments, an optimal wavefront can be realized as a linear combination of a subset of the eigenmodes of the enclosure whose eigenfrequency is in the proximity of the CPA frequency (found via the zero of the scattering matrix). The dimensionality (i.e. number of eigenmodes) that will span this subset may depend on the Ericson parameter (ratio of mean linewidth to the mean level spacing). This subspace can be used to construct an auxiliary scattering matrix and an associated Green's operator, which can be used for the evaluation of CPA following the mechanisms described herein.

FIG. 1 shows an example of a system 100 that can be used to implement wireless power transfer according to some embodiments of the disclosed subject matter. As shown in FIG. 1, the system may comprise a controller 102, one or more ports 104, one or more tuning elements 106, and a communication network 108. The system 100 may further comprise one or more targets 110, and each of the one or more targets 110 may or may not further comprise a tuning element 116 of the same or similar type and purpose as tuning element 106. The target 110 may comprise an antenna 144 for communicating via the communication network 108 or a separate network. The antenna 144 may additionally or alternatively be used by the target for receiving excitation energy.

The port 104 may comprise a mechanism for transmitting (e.g., generating) and/or receiving excitation energy. In some embodiments, the port 104 may comprise a transmitter 120 and a receiver 130 coupled with an antenna 140. In some embodiments, the transmitter 120 and the receiver 130 may be a single component (e.g., a transceiver). In some embodiments, the controller 102 may comprise a port 114 of the same or similar type and purpose as port 104, which may further include an antenna 142.

When referring to ports 104 herein, it will be understood that the reference may encompass ports 114. When referring to tuning element 106 herein, it will be understood that the reference may encompass tuning element 116.

The ports 104, one or more tuning elements 106, and one or more targets 110 may be contained within an enclosure 150. The communication network 108 may be completely external, completely internal, or a combination of external and internal to the enclosure 150. The controller 102 may or may not be contained within the enclosure 150.

The communication network 108 may comprise any suitable network for facilitating communication between the various components of the system 100. In some embodiments where the components are directly networked (e.g., a direct Bluetooth connection, direct ethernet connection, etc.), the communication network 108 may comprise the communication medium through which the communication signals travel (e.g., the electromagnetic field at the communication frequency, an ethernet cable, etc.). In some embodiments, the communication network 108 may comprise a wireless access point, router, gateway, switch and/or other LAN or WAN management device. In some embodiments, the communication network 108 may comprise a combination of various communication systems and methods. For example, the communication network 108 may include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 108 may be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

Various components of the system 100 may be communicatively coupled with one or more other components of the system, for example via the communication network 108. In some embodiments, for example, the controller 102 may be communicatively coupled with the ports 104 and the tuning element 106. In some embodiments, the controller 102 may be communicatively coupled with one or more targets 110. In some embodiments, the controller 102 may be directly communicatively coupled with the tuning element 106 (e.g., via a peer-to-peer, via a wired communication link, etc.) and/or may be indirectly communicatively coupled with the tuning element 106 (e.g., via the communication network 108). In some of the embodiments where the target 110 comprises the tuning element 106, the controller 102 may be directly communicatively coupled with the tuning element 106 and/or indirectly communicatively coupled with the tuning element 106 (e.g., communication sent to/through target 110 to control the tuning element 106).

Communication through and between the various components of the system 100 may be accomplished by any suitable system or method. In some embodiments, the controller 102 may be coupled with the targets 110, ports 104, and/or tuning element 106 using the communication network 108, such as via WiFi, Bluetooth, 5G, ethernet, a local area network (LAN), a wide area network (WAN), Zigbee, Z-wave, serial port, USB, Thunderbolt, proprietary and/or special purpose electrical and/or wireless communicative coupling, and the like. In some embodiments, multiple methods of communicative coupling may be used, for example, a first method for communicating with the tuning element 106, a second method for communicating with the ports 104, and so on. In some embodiments, the communication may comprise commands, settings, measurements, and the like.

The ports 104 may comprise any suitable system and/or method for generating excitation energy. The excitation energy may comprise pressure waves (e.g. sound), vibration, electromagnetic waves, or other suitable oscillation energy. In some embodiments, the ports 104 may comprise an antenna device which converts input power into an oscillating electromagnetic field, such as a coil of wire, a metal plate, an antenna that generates radio waves, a wave antenna, a laser that generates light, and the like. In some embodiments, the excitation energy may comprise electromagnetic ("EM") radiation, for example having a wavelength in a range of about one meter to one millimeter (e.g., having a wavelength in a range of about 300 megahertz (MHz) to 300 gigahertz (GHz), respectively) and referred to as microwave. In some embodiments, the antenna device may comprise any suitable transmitter 120 (for example, a signal generator) coupled with an antenna 140 for generating (also referred to as transmitting) microwaves.

The enclosure 150 may comprise any region which partially or completely returns (e.g., reflects, scatters, etc.) the excitation energy back into the enclosure 150. The enclosure 150 may comprise a reverberating environment. In some embodiments, the enclosure 150 may comprise a room, a house, an office, a library, a coffee shop, a restaurant, a vessel (e.g., aircraft, ship, automobile, truck, spacecraft, etc.), warehouse, operating room, medical facility, lecture hall, theatre, store, garage, and the like. The enclosure 150 may be much larger than the wavelength of the excitation energy transmitted by the ports 104. Other (permanent or impermanent, mobile or immobile) objects, materials, and the like within the enclosure 150 may also reflect, scatter, absorb, refract, diffract, and/or otherwise affect propagation of the excitation energy. The response of an enclosure 150 to excitation energy may be referred to herein as the scattering response, and the parameters of the enclosure 150 which affect the response may be referred to as scattering properties.

Figure 3:
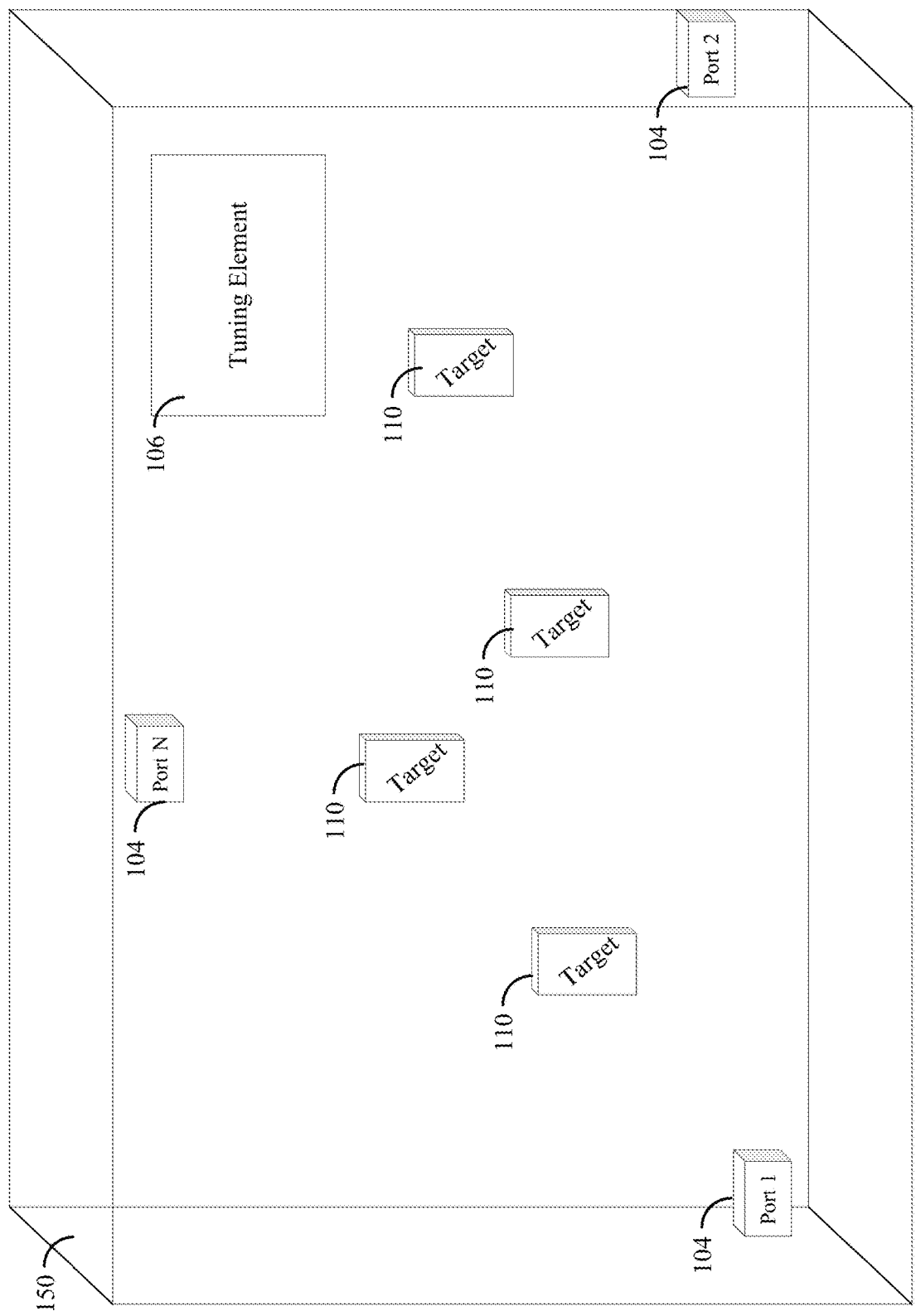
FIG. 3 shows a view of an environment in which a system for long-range wireless power transfer in complex ray-chaotic environments has been implemented in accordance with some embodiments of the disclosed subject matter.

Referring briefly to FIG. 3, two or more ports 104 (Ports 1 through N) may be arranged to transmit excitation energy, such as electromagnetic energy, into the enclosure 150. The enclosure may contain a variable number of targets 110 configured to receive a portion of the excitation energy. In some embodiments, the ports 104 may be placed within or adjacent to the room. In some embodiments, the ports 104 may be placed in close proximity to each other. In other alternative embodiments, the ports 104 may be placed as far away from each other as possible within the enclosure 150. In yet other embodiments the ports 104 may be placed at random locations within the enclosure 150. In some embodiments, the ports 104 may be placed equidistant from each other. In some embodiments, the ports 104 may be placed such that they have reasonable line of sight to probable locations of one or more target devices 110 and/or tuning element(s) 106.

In some embodiments, the wave chaotic nature of the enclosure 150 facilitates the excitation energy finding the targets 110 with high probability of success by means of reverberation. In such embodiments, the constraints on the placement of the ports 104, targets 110, and/or tuning element 106 are relaxed. For example, line of sight to and/or between the ports may not be required, and the ports 104 may not need to be regularly spaced.

Referring again to FIG. 1, the ports 104 may further comprise any suitable system and/or method for receiving the scattered excitation energy. The received excitation energy may comprise the same type and/or frequency of oscillation energy as generated by the ports 104. In some embodiments, the ports 104 may comprise an antenna device which converts the oscillating electromagnetic field into an electric current. The electric current may be an oscillating or alternating current, which can be used for example to power a load. In some embodiments, the ports 104 may comprise any suitable antenna for receiving microwaves. In some embodiments, the ports 104 may use the same antenna to generate as well as receive the excitation energy, for example using a circulator or time-multiplexing. The ports 104 may comprise antenna 140 particularly tuned for a specific frequency or range of frequencies of electromagnetic radiation.

In some embodiments, the ports 104 may determine the response of the enclosure 150 to the excitation energy, for example converting the received excitation energy into one or more analog or digital values indicating a frequency, phase, and/or amplitude of the received excitation energy. Any suitable system or method may be used. In some exemplary embodiments, when the excitation energy comprises radio waves (such as microwaves), the ports 104 may comprise an antenna 140 coupled with a receiver 130. The antenna 140 coupled with the receiver 130 may be the same or separate from the antenna 140 coupled with the transmitter 120. The receiver 130 may, for example, comprise a RF front end or low-noise block downconverter, which may further comprise one or more analog-to-digital converters and/or digital filters, to provide an analog or digital representation of the received scattered radio wave.

The ports 104 may be configured to control the frequency, magnitude, and phase of the generated excitation energy. The ports 104 may be configured to measure the frequency, magnitude, and phase of the received scattered excitation energy.

In some embodiments, the antenna may be about the same size as the wavelength or a fraction of the wavelength (e.g., a half-wavelength, a quarter-wavelength), such as a monopole or dipole antenna. In some embodiments, the antenna may comprise a high-gain antenna or an optical system which concentrates the electromagnetic radiation in a more narrow beam. In certain exemplary embodiments, the antenna may comprise any suitable system or method of dispersing electromagnetic radiation into the enclosure 150.

A tuning element 106 within or otherwise part of the enclosure 150 may be configured to tune the scattering properties of the excitation energy within the enclosure 150. This may be accomplished through a number of mechanisms, such as motion of a conducting or non-conducting object within the enclosure 150, a change in excitation energy absorption rate, a variation in the phase shift of the propagating excitation energy, addition or deletion of one or more objects from the enclosure 150, and/or any other controllable disturbance that alters the magnitude and/or phase of the excitation energy at a given location. In some embodiments, the tuning of the scattering properties may be accomplished by one or more mechanical, electrical, electronic, acoustic, and/or magnetic mechanisms. In some embodiments, the tuning of the scattering properties may be accomplished by having a tunable reactance, such as capacitance or inductance. In some embodiments these mechanisms may be accomplished by one or more reconfigurable elements 118. In some embodiments, the reconfigurable element 118 may comprise an attenuator, for example a controllable variable attenuator.

In some embodiments, the reconfigurable element 118 may comprise a reconfigurable metasurface, for example as described by Frazier et al., *Wavefront shaping with a tunable metasurface: Creating cold spots and coherent perfect absorption at arbitrary frequencies*, Phys. Rev. Research 2, 043422 (2020). The reconfigurable metasurface may comprise many small individually addressable elements that can be toggled between states of reflecting excitation energy (e.g., microwave radiation) with either a 0-degree or 180-degree phase shift. In some embodiments, the reconfigurable metasurface may have more granular control of phase shift. In some embodiments, the reconfigurable metasurface may have variable loss, variable nonlinearity, and/or any other mechanism to alter the scattering properties of the excitation energy within the enclosure 150.

The target 110 may comprise any device configured to receive excitation energy of the type provided by the ports 104. In some embodiments, the target 110 may comprise an electronic device having an antenna or light sensor capable of receiving electromagnetic radiation. In certain exemplary embodiments, the target 110 comprises an antenna 144 capable of receiving microwave energy. In some embodiments, the antenna 144 for receiving the excitation energy may also be used for other functions, for example communication with other devices, communication with the controller 102, communication through the communication network 108, and the like.

Figure 2:
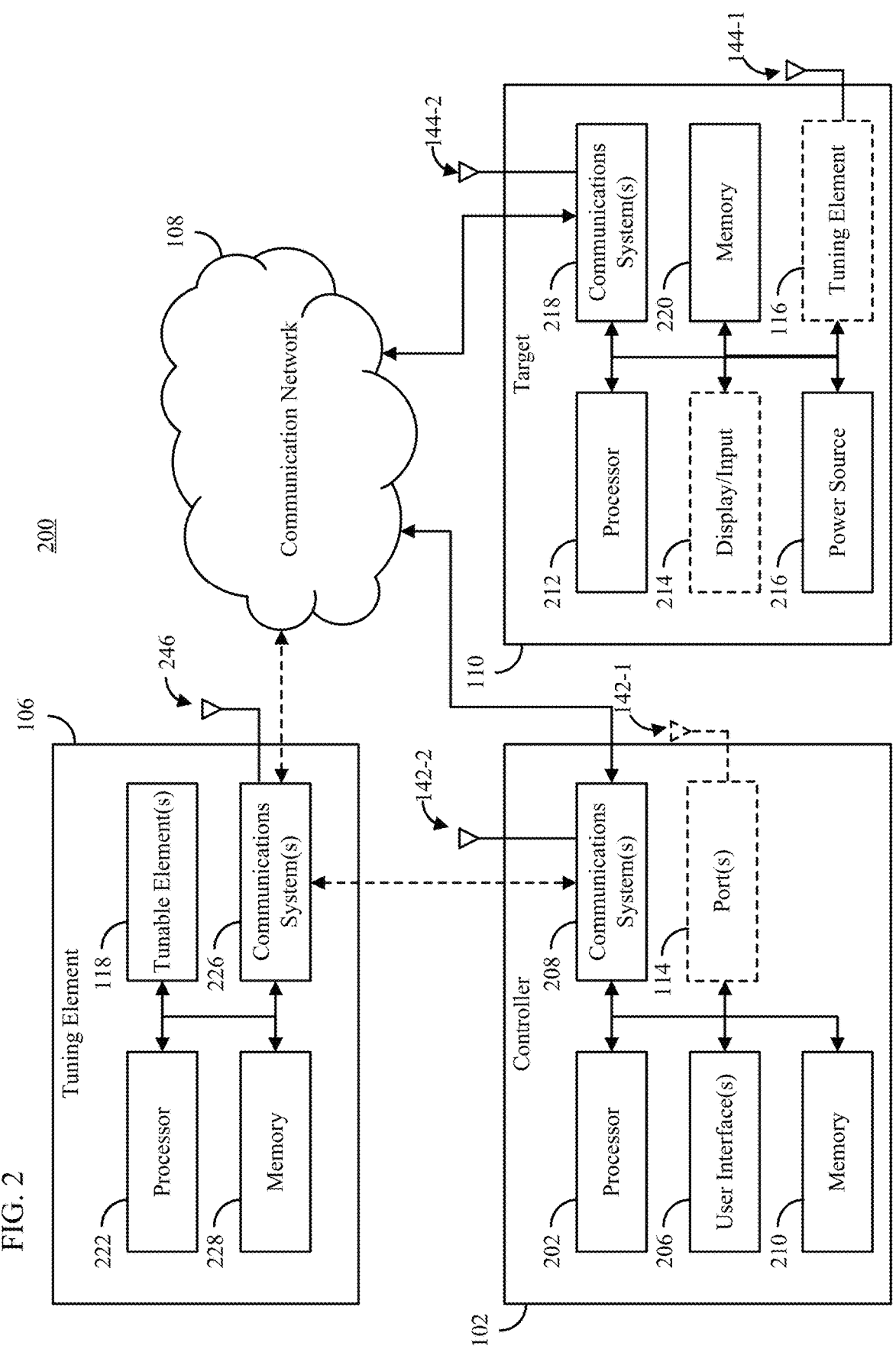
FIG. 2 shows an example of hardware that can be used to implement a controller, a tuning element, and a target, shown in FIG. 1 in accordance with some embodiments of the disclosed subject matter.

FIG. 2 shows an example of hardware 200 that can be used to implement a controller, a tuning element, and a target, shown in FIG. 1 in accordance with some embodiments of the disclosed subject matter.

In some embodiments, the target 110 may comprise a processor 212, display/input 214, a tuning element(s) 116, one or more communications systems 218, memory 220, a power source 216. In some embodiments, processor 212 can be any suitable hardware processor or combination of processors, such as a CPU, a GPU, an ASIC, an FPGA, etc. In some embodiments, tuning element(s) 116 may include be any suitable components to alter a scattering response of the system 100 (e.g., a scattering response within the enclosure 150). For example, tunable elements 116 may include one or more variable attenuators, one or more metamaterials, etc. The memory 220 may include any suitable volatile memory, non-volatile memory, storage, any other suitable type of storage medium, or any suitable combination thereof. For example, the memory may include RAM, ROM, EEPROM, one or more flash drives, one or more hard disks, one or more solid state drives, one or more optical drives, etc. In some embodiments, the memory 220 may have encoded thereon a computer program for controlling operation of the target 110.

Referring to FIG. 2, the target 110 may be configured to use the received excitation energy to power all or a portion of the device. In some embodiments, the target 110 may comprise a power source 216 (such as a rechargeable battery), and the target 110 may be configured to convert the received excitation energy into stored power (e.g., by charging the rechargeable battery with electric current derived from the received excitation energy). In some embodiments, the target 110 may comprise any suitable device or combination of devices. For example, the target may comprise a mobile (or immobile) computing device such as a laptop, cell phone, tablet, handheld gaming device, and the like. As another example, the target 110 may comprise a portable electronic device, such as wireless earbuds, a wireless earbud case, a portable battery bank, an electronic watch, an electric toothbrush, a remote control (such as a tv or stereo remote control), an electric vehicle, a source of illumination (e.g., a LED light), and the like.

As described above, in some embodiments the target 110 may further comprise a tuning element 116. For example, the target 110 may comprise a tunable scattering property. In some embodiments, such a tunable scattering property may comprise an electronically tunable lossy element optionally coupled with an antenna of the target 110, such as an antenna 144-1 which receives the excitation energy. In some embodiments, the tuning element 116 may comprise a variable attenuator, for example a voltage-dependent nonlinear resistor, a variable linear resistor controllable or predefined to have different linear resistance values, and the like. In some embodiments, wherein the tuning element 116 function by absorbing excitation energy, the tuning element 116 may provide the absorbed energy to the target 110. In some embodiments, tuning element(s) 116 may be omitted (e.g., tuning element 106 may be used to adjust a scattering response of system 100). In some embodiments, tuning element(s) 106 may be omitted (e.g., tuning element(s) 116 may be used to adjust a scattering response of system 100). In some embodiments, tuning elements 106 and 116 may be used to adjust a scattering response of the system 100.

As previously described, the target 110 may be communicatively coupled with the controller 102 (e.g., via 5G, WiFi, Bluetooth, etc.), for example via communication system 218 and antenna 144-2, and may receive a setting for the tuning element 106 from the controller 102. The target 110 may configure the tuning element 106 according to the setting according to any suitable system or method. In some embodiments, the antennas 144-1 and 144-2 comprise the same antenna.

The controller 102 may comprise a processor 202, a communication system 208, and memory 210. In some embodiments, the processor 202 may be any suitable hardware processor or combination or network of processors. The processor(s) 202 may comprise a central processing unit (CPU), a graphics processing unit (GPU), a general-purpose processor, a special-purpose processor, a signal processor, an application-specific integrated circuit (ASIC), a field programmable gate array (FPGA), and/or the like.

In some embodiments, the memory 210 may include any suitable storage device or devices that can be used to store instructions, values, etc., that can be used, for example, by the processor 202 to control operation of the ports 104 (e.g. to cause the ports 104 to individually transmit excitation energy of a given frequency, amplitude, and/or phase) and/or tuning element 106 (e.g. to set the tuning element to a particular setting), and/or to receive signals from the ports 104 (e.g., to receive, measure, or otherwise detect the frequency, phase, and/or amplitude of the received excitation energy from each port, etc.).

The memory 210 may include any suitable volatile memory, non-volatile memory, storage, any other suitable type of storage medium, or any suitable combination thereof. For example, the memory may include RAM, ROM, EEPROM, one or more flash drives, one or more hard disks, one or more solid state drives, one or more optical drives, etc. In some embodiments, the memory 210 may have encoded thereon a computer program for controlling operation of the controller 102, ports 104, and/or the tuning element 106. In some embodiments, the computer program may facilitate communication with the ports 104, the tuning element 106, and/or the target 110, for example via the communication network 108. In some such embodiments, the processor may execute at least a portion of the computer program to control the ports 104 to provide power to one or more targets 110 within the system. In some embodiments, the computer program may comprise firmware.

In some embodiments, tuning element 106 may comprise a processor 222, a reconfigurable element 118 (e.g., including one or more variable attenuators, one or more addressable elements that can be toggled between states of reflecting excitation energy, one or more movable elements, etc.) or multiple reconfigurable elements 118, one or more communications systems 226, and/or memory 228. In some embodiments, processor 222 can be any suitable hardware processor or combination of processors, such as a CPU, a GPU, an ASIC, an FPGA, etc. In some embodiments, reconfigurable element(s) 118 may include any suitable components to alter a scattering response of the system 100 (e.g., a scattering response within the enclosure 150). For example, reconfigurable elements 118 may include one or more variable attenuators, one or more metamaterials, etc. The memory 228 may include any suitable volatile memory, non-volatile memory, storage, any other suitable type of storage medium, or any suitable combination thereof. For example, the memory may include RAM, ROM, EEPROM, one or more flash drives, one or more hard disks, one or more solid state drives, one or more optical drives, etc. In some embodiments, the memory 228 may have encoded thereon a computer program for controlling operation of the tuning element 106.

The communication systems 208, 218, 226 may be configured to provide such communication functions. For example, the communication systems 208, 218, 226 may comprise one or more modems, Bluetooth transceivers, WiFi radios, ethernet network devices, and the like. In some embodiments, the controller communication system 208 may be coupled with an antenna 142-2 for wireless communication. In some embodiments, the tuning element communication system 226 may be coupled with an antenna 246 for wireless communication. As described above, in some embodiments, the target communication system 218 may be coupled with an antenna 144-2 for wireless communication. In some embodiments, the controller antennas 142-1 and 142-2 comprise the same antenna. In some embodiments, the target antennas 144-1 and 144-2 comprise the same antenna.

In some embodiments, the tuning element 106 may be configured to communicate with the controller 102 via the communication network 108. Additionally or alternatively, in some embodiments, the tuning element 106 may be configured to communicate with the controller 102 via a connection that bypasses the communication network 108 (e.g., via a wired communication mechanism, such as ethernet, fiber optics, etc.).

In some embodiments, the controller 102 may include a user interface 206, which can be used to communicate information to a user. For example, the user interface 206 may include a display, one or more indicator lights (e.g., one or more LEDs), a speaker, etc. In some embodiments, the user interface 206 may be used to indicate a status of controller 102, such as whether controller 102 is powered on, whether controller 102 is transmitting power (e.g., via one or more ports, such as the port(s) 104, the port(s) 114, etc.), whether one or more targets are receiving power (e.g., based on feedback to the controller 102 from one or more of the targets).

In some embodiments, the target 110 may include a display and/or input 214. In some embodiments, display/input 214 can include any suitable display and/or output devices, such as a computer monitor, a touchscreen, a television, a speaker, etc. Additionally or alternatively, in some embodiments, display/inputs 214 can include any suitable input devices and/or sensors that can be used to receive user input, such as a keyboard, a mouse, a touchscreen, a microphone, one or more buttons, etc. In some embodiments, display/input 214 can be omitted from target 110 (e.g., if target 110 includes no user interface).

In some embodiments, port 104 can include similar components to controller 102, such as a processor, communication system(s), memory, etc. Alternatively, in some embodiments, port 104 can include components for generating and detecting excitations (e.g., EM waves, sound waves, etc.), and may not include a processor, communication system, etc. For example, the controller 102 can be electronically coupled to a port by a wire, a waveguide, etc., and can supply power and/or signals that cause the port to emit energy and/or detect energy.

Figure 5:
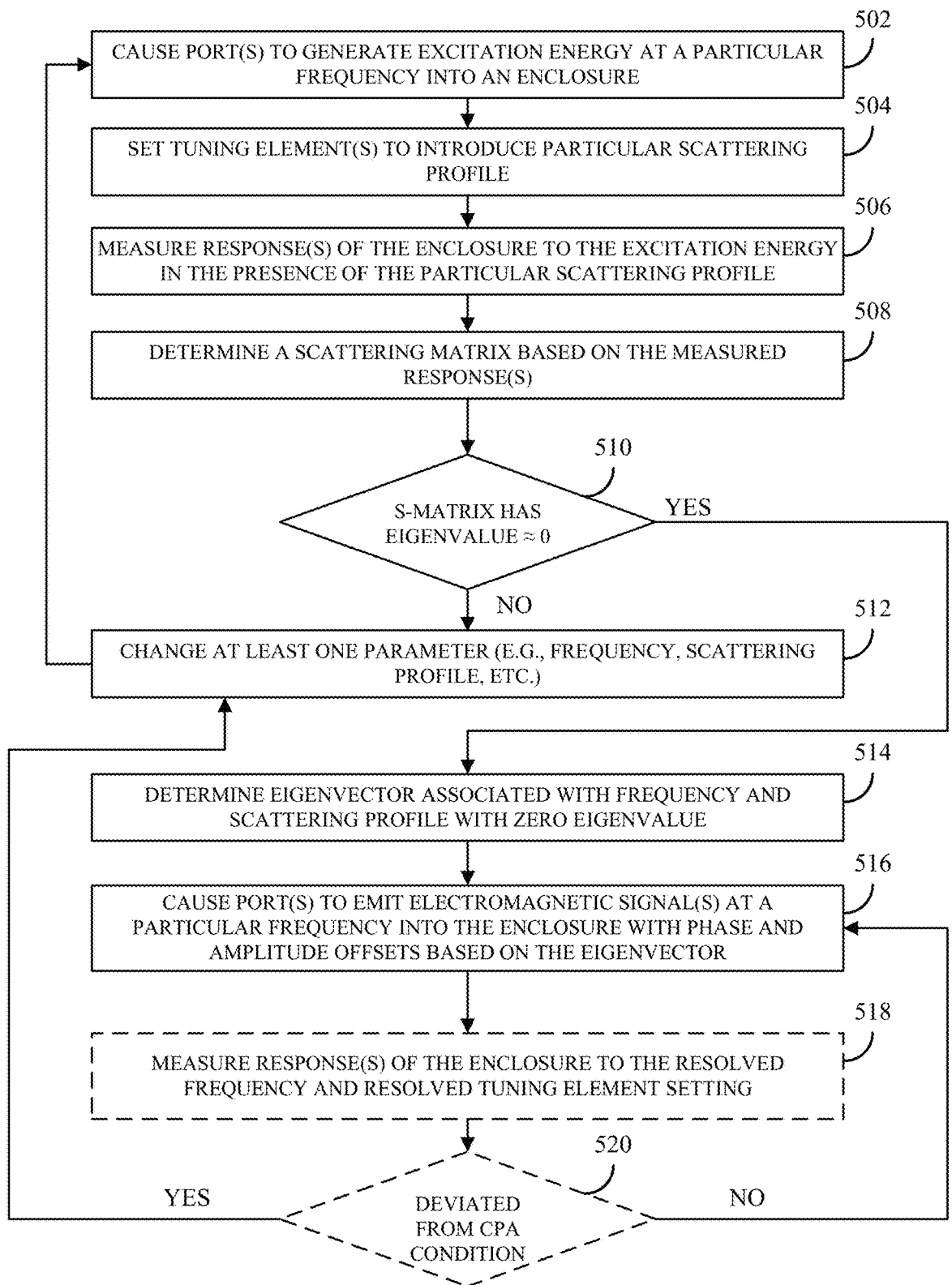
FIG. 5 shows an example of a process for long-range wireless power transfer in complex ray-chaotic environments in accordance with some embodiments of the disclosed subject matter.

FIG. 5 shows an example of a process 500 for wireless power transfer using a wireless power transfer system 100 in accordance with some embodiments of the disclosed subject matter.

At 502, the process 500 can cause the ports 104 (e.g., including port(s) 114) to generate excitation energy at a first frequency. In some embodiments, the controller 102 may communicate with the ports 104 and/or ports 114 to control the frequency, amplitude, and/or phase of the excitation energy. In some embodiments, all ports 104 may be controlled to generate excitation energy at the same frequency, amplitude, and phase. In some embodiments, the excitation energy comprises EM radiation, for example microwaves.

At 504, the process 500 can set (controlling) the tuning element 106 to a first setting. This may be done before, after, or simultaneously with causing the ports to generate excitation energy at a first frequency 502. In some embodiments, the controller 102 may communicate with the tuning element 106 to control its setting. In some embodiments, multiple tuning elements 106 may be controlled to the same setting or may be independently set to individual settings. In some embodiments, setting the tuning element 106 may comprise sending a command or other appropriate instruction or control to cause the tuning element 106 to take on a particular state of reflecting, absorbing, and/or scattering the excitation energy. For example, the tuning element 106 may comprise a reconfigurable metasurface and setting the tuning element 106 may comprise controlling each of the individually addressable elements to a state of reflecting the excitation energy with a 0-degree or 180-degree phase. In some embodiments, setting the tuning element 106 to a first setting 504 may comprise setting a variable attenuator to provide a particular attenuation.

At 506, the process 500 can acquire, from the plurality of ports 104, the response of the enclosure 150 to the selected excitation energy in the presence of the one or more set tuning elements 106. The ports 104 may measure the scattered excitation energy response. In some embodiments, the ports 104 may measure the response of the enclosure 150 to the generated EM radiation (e.g., microwave) in view of the one or more set tuning elements 106, for example receiving the scattered EM response from the enclosure 150.

At 508, the process 500 can determine the scattering matrix (also referred to as the S-matrix) using the enclosure 150 response measured at the ports 104. The wave properties of the system 100 may be described by an N×N complex scattering matrix S, where N is the number of ports 104 in the system 100. The S-matrix connects the incoming and outgoing waves through these N ports as:

$$\Phi_{out} = S\Phi_{in}$$

where $\Phi_{out}$ ($\Phi_{in}$) is an N-component vector of outgoing (incoming) wave amplitudes and phases that defines the outgoing (incoming) field in the channel-mode space. In the case of CPA, all input energy is absorbed by the system 100, thus requiring $\Phi_{out}$ to be zero:

$$S\Phi_{in} = 0$$

for non-zero $\Phi_{in}$. For CPA, the S-matrix is not invertible such that it has a zero eigenvalue:

$$\lambda_S = 0$$

In the case of CPA, the S-matrix may be sub-unitary due to the presence of absorption and/or other loss within the enclosure 150.

Figure 4:
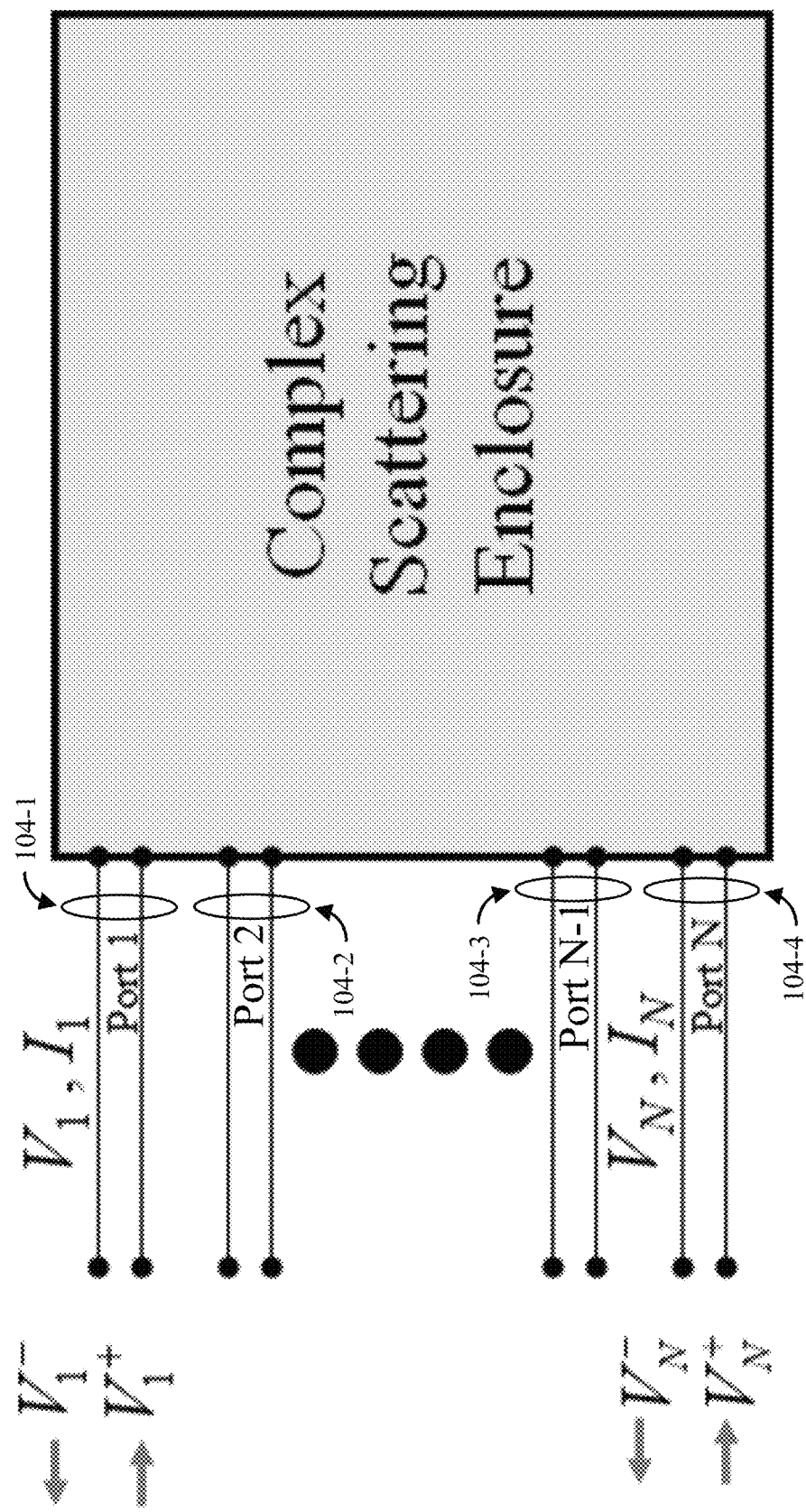
FIG. 4 shows an example schematic representation of ports of a system for long-range wireless power transfer in complex ray-chaotic environments in accordance with some embodiments of the disclosed subject matter.

Briefly referring to FIG. 4 for example, excitation energy may be input to a complex scattering enclosure (e.g., enclosure 150) at a plurality of ports 104, and the response of the enclosure measured at the plurality of ports 104. The excitation energy and response may be EM, such that voltage V and current I fluctuate at the ports 104 (e.g. in an antenna). In such embodiments, the input excitation energy may be referred to as $V_1^+$ to $V_N^+$ for ports 1 to N, and the measured response may be referred to as $V_1^-$ to $V_N^-$ for ports 1 to N. The S-matrix relates the input excitation energy to the measured response:

$$\begin{bmatrix} V_1^- \\ V_2^- \\ \vdots \\ V_N^- \end{bmatrix} = [S] \cdot \begin{bmatrix} V_1^+ \\ V_2^+ \\ \vdots \\ V_N^+ \end{bmatrix}$$

In a more general representation, having input excitation energy A (e.g., magnitude and phase) and measured response B (e.g., magnitude and phase), the S-matrix is given by:

$$\begin{bmatrix} B_1 \\ B_2 \\ \vdots \\ B_N \end{bmatrix} = \begin{bmatrix} S_{11} & S_{12} & \ldots & S_{1N} \\ S_{21} & S_{22} & \ldots & S_{2N} \\ \vdots & \vdots & \ddots & \vdots \\ S_{N1} & S_{N2} & \ldots & S_{NN} \end{bmatrix} \cdot \begin{bmatrix} A_1 \\ A_2 \\ \vdots \\ A_N \end{bmatrix}$$

The S-matrix may be a complex function of frequency, $S(\omega)$, and may also depend on the specific arrangement of the enclosure 150 (including size, tuning element(s), object(s), materials, temperature, and the like).

In a particular example, in a particular system with particular properties (e.g., including two ports) and particular excitations, the process 500 may determine that the S-matrix is:

$$S = \begin{pmatrix} -0.3146 + 0.2159i & 0.0996 - 0.1940i \\ -0.1714 + 0.2675i & 0.0143 - 0.1808i \end{pmatrix}$$

and may calculate an eigenvalue $\lambda_S = 0.0009 - 0.0002i$ having a magnitude $|\lambda_S| = 9.56 \times 10^{-4}$ when excited with input energy $\Phi_{in}$ that can be represented as $$\Phi_{in} = \begin{pmatrix} 0.4355 - 0.2358i \\ 0.8687 \end{pmatrix} = \begin{pmatrix} 0.4953 e^{-i*28.43°} \\ 0.8687 \end{pmatrix},$$

$$\Phi_{out} = 10^{-3} * \begin{pmatrix} 0.3616 - 0.3058i \\ 0.8132 - 0.1698i \end{pmatrix},$$

and with
where $i = \sqrt{-1}$.

At 510, the process 500 can determine one or more eigenvalues of the determined S-matrix. There may be N eigenvalues of the S-matrix. The eigenvalues of the S-matrix may be a function of the frequency of the excitation energy. The process 500 can determine if an S-matrix eigenvalue is approximately zero. As discussed above, for a condition of CPA, the S-matrix will have a zero eigenvalue. In some embodiments, if the process 500 determines the eigenvalue is zero or alternatively is within a tolerance of zero, then it may advance to 514 to determine an eigenvector (described further below). In some embodiments, the process 500 at 510 may determine a plurality of the eigenvalues of the S-matrix, and may determine if one or more is approximately zero.

Figure 8:
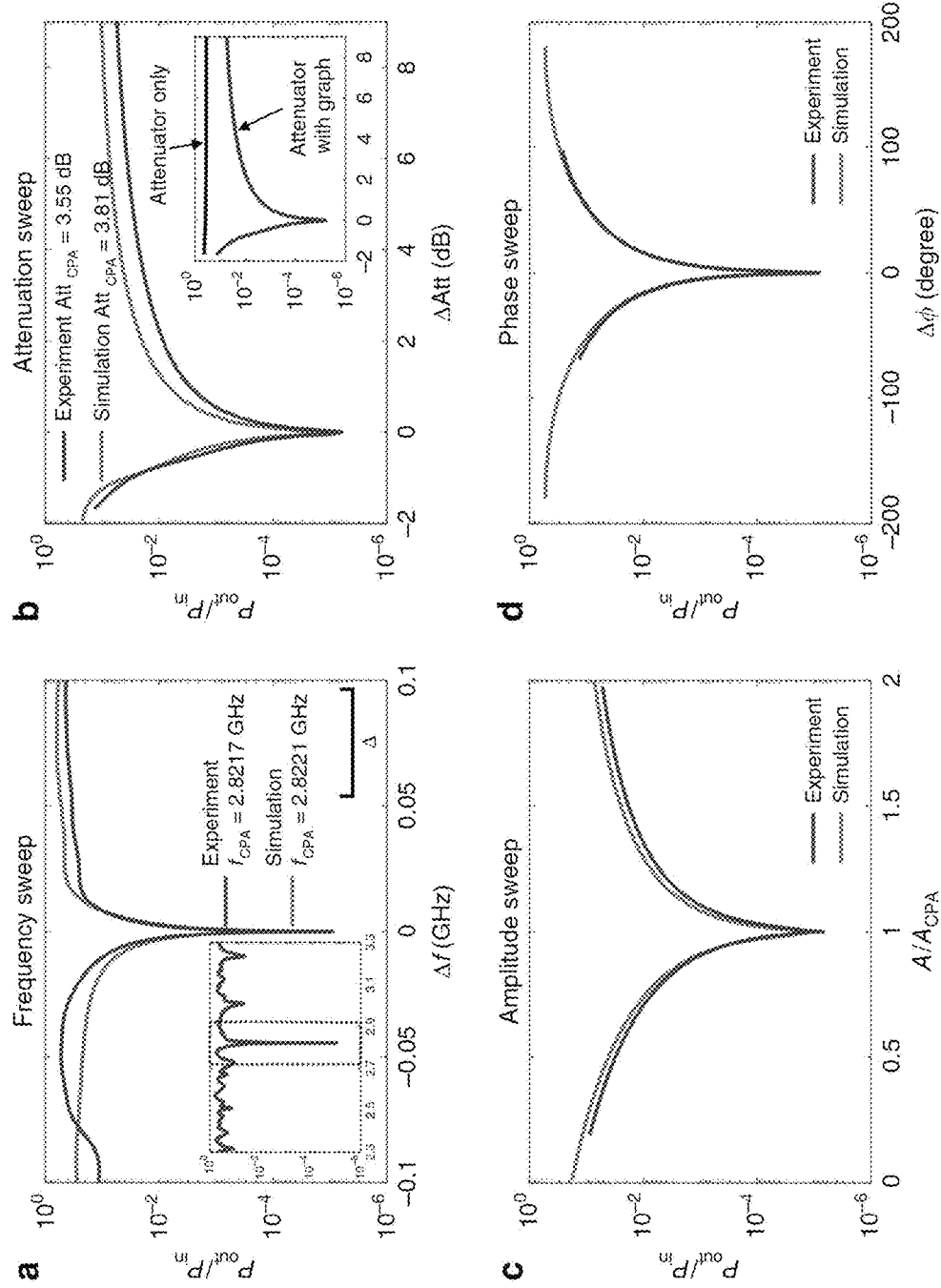
FIG. 8 shows examples of a ratio of power output by the port to power input at the port at various parameters settings generated using the system of FIG. 6 and the simulated system.
Figure 10:
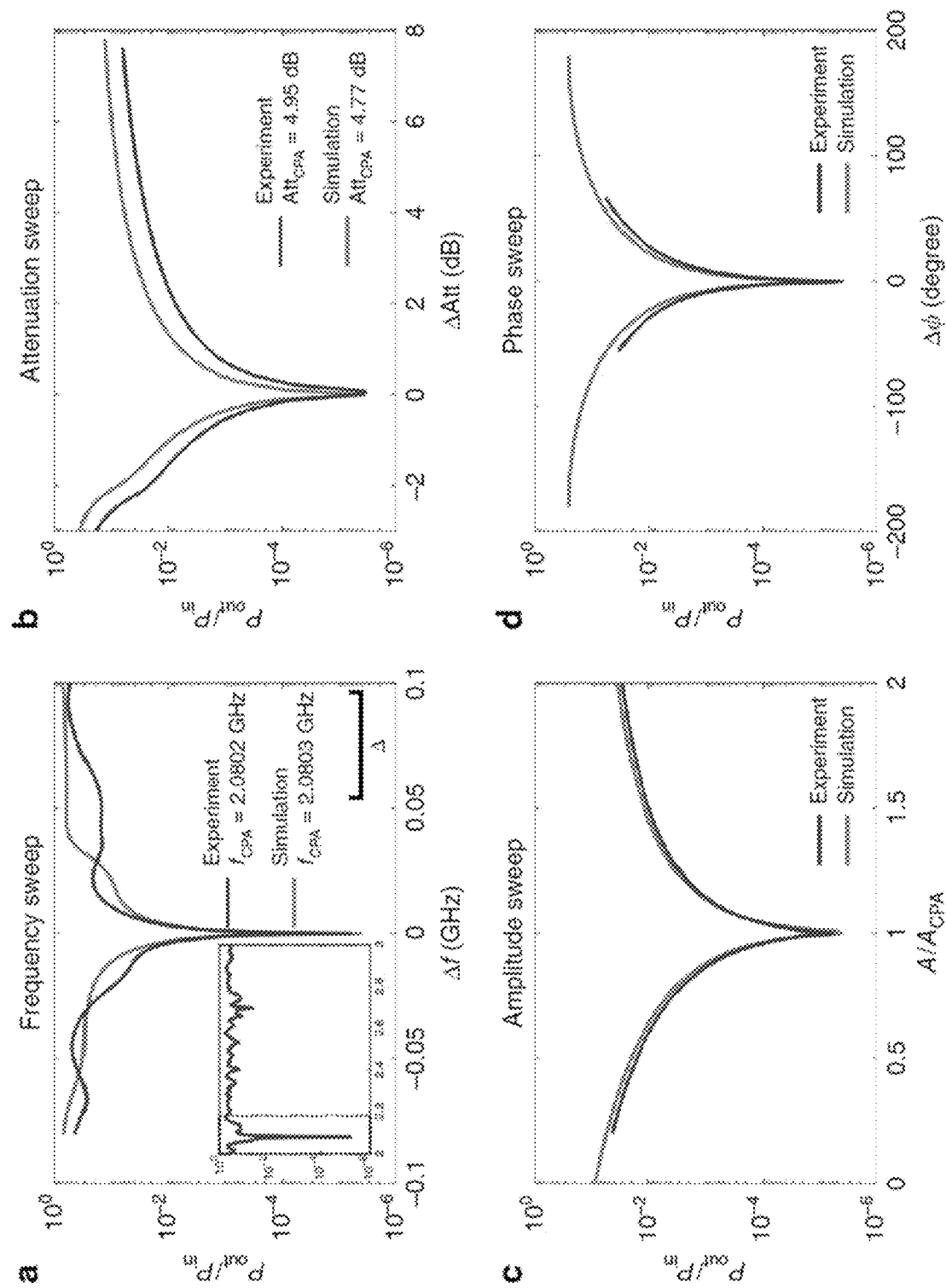
FIG. 10 shows examples of a ratio of power output at the port to power input by the port at various parameters settings generated using the system of FIG. 6 and the simulated system implemented to insure that a broken-time reversal invariance condition is present.
Figure 11:
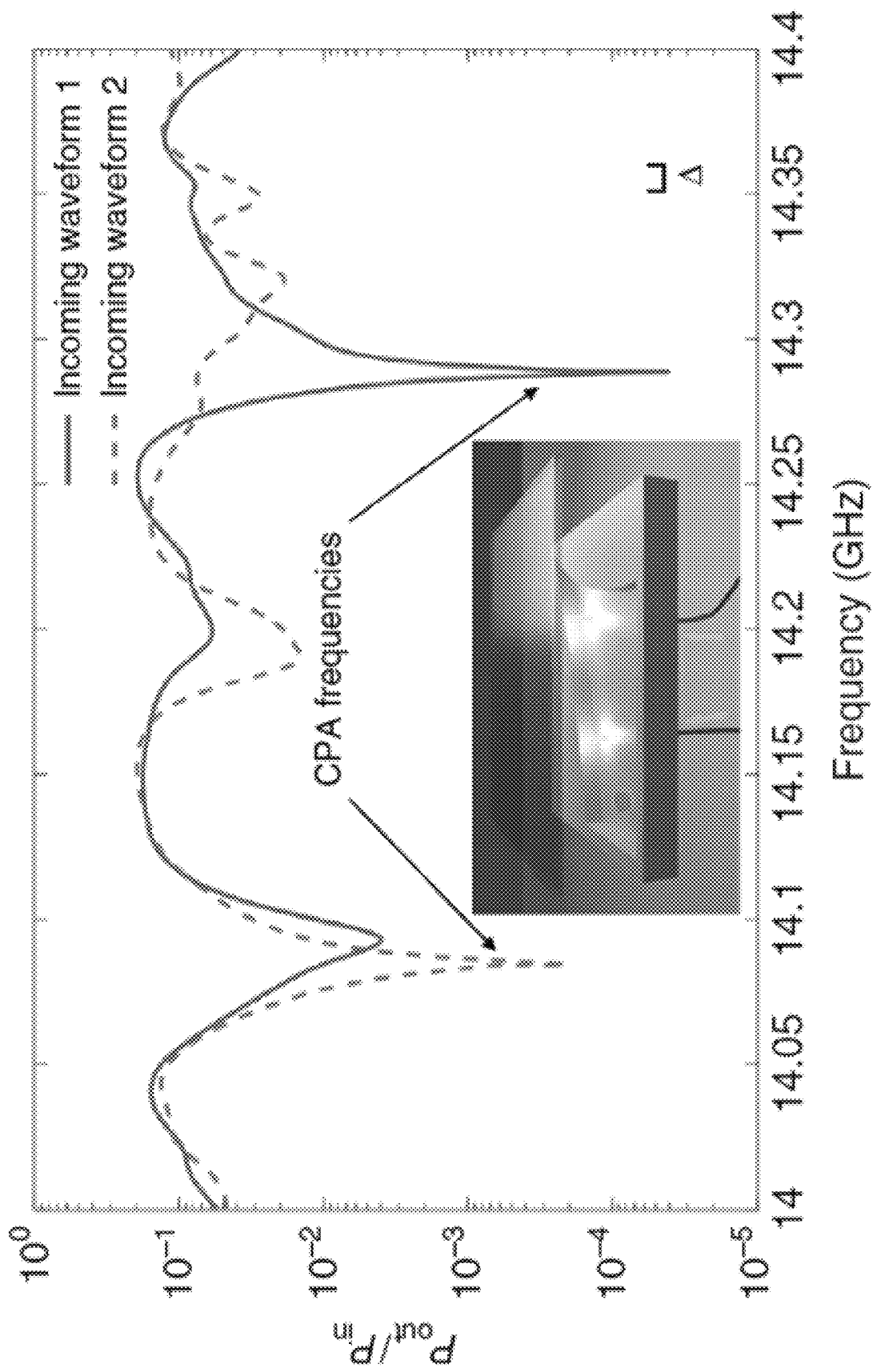
FIG. 11 shows an example of a two-dimensional quarter bow-tie billiard system for demonstrating the viability of long-range wireless power transfer in complex ray-chaotic environments in accordance with some embodiments of the disclosed subject matter, and a ratio of power output by the port to power input at the port at various parameters settings under two different waveform conditions.

In some embodiments, the tolerance may facilitate finding conditions that facilitate a sufficient power transfer to the enclosure without requiring that a perfect zero eigenvalue be found. In some real systems, a perfect zero eigenvalue may not be obtainable or reasonably obtainable, for example requiring significant time to find or due to limitations of the ports 104 and tuning elements 106 (e.g., limited amount of settings available). Finding an eigenvalue that is relatively close to zero can facilitate substantial power transfer. For example, a tolerance may comprise a certain power absorption amount and/or percentage. In some embodiments, the tolerance may require absorption of 50%, 75%, 90%, 95%, 98%, 99%, 99.9%, 99.99%, or the like, of the excitation energy. Referring to FIGS. 8, 10, and 11, for example, a ratio of $P_{out}/P_{in}$ may be determined, and the tolerance may comprise a criteria regarding the ratio, for example <$10^{-4}$. The eigenvalue may be related to the power absorption ratio according to $P_{out}/P_{in} = |\lambda_S|^2$, and the tolerance may for example comprise $|\lambda_S| < 10^{-2}$ (or <$10^{-1}$, <$10^{-3}$, <$10^{-4}$, and the like). For example, with a tolerance of $|\lambda_S| < 10^{-2}$, the power absorption ratio may be at least 99.99%.

In some embodiments, if the process 500 determines the eigenvalue is not zero or alternatively is not within a tolerance of zero, then the process at 512 may change a property of the system 100 and repeat the process 500. In some embodiments changing a property of the system 100 may comprise changing the excitation frequency used at 502 and/or the tuning element 106 setting used at 504. In some embodiments, process 500 can repeat 502 through 510 at least until the process 500 finds a zero eigenvalue or an eigenvalue within a tolerance of zero.

In some embodiments, at 510 the process 500 may store relevant information (for example the currently-set excitation frequency, tuning element setting, response measurement, S-matrix, and/or eigenvalue) once the search criteria 510 (e.g., eigenvalue within tolerance of zero) is satisfied. In some embodiments, once criteria 510 is satisfied, the process 500 may advance to 514. The particular frequency and tuning element setting may be considered as selected by the process 500 to achieve the CPA (or near-CPA if using a tolerance) condition.

In some embodiments, once a zero eigenvalue or an eigenvalue within tolerance of zero is found, the process 500 at 510 may continue searching for additional solutions (e.g., additional frequency and/or tuning element settings that satisfy the eigenvalue criteria) by proceeding to 512 (in some cases, in parallel with proceeding to 514) and then repeating 502 through 510. In such embodiments, the process 500 may for example repeat the search until it finds an eigenvalue within a second (e.g., tighter) tolerance of zero, until it has a sufficiently large selection of solutions to choose from, and/or the like. In some embodiments, the process 500 at 510 may sweep frequency from a start to end frequency and/or may sweep tuning element setting(s) from a start to end setting. The process may use any suitable stop criteria to determine whether to stop searching for solutions. The process 500 at 510 may then select a particular solution, e.g. a particular frequency and tuning element setting satisfying the eigenvalue criteria at 510. The selected frequency and tuning element setting may be referred to as the resolved frequency and resolved tuning element setting, respectively.

In some embodiments, the process 500 at 510 may determine and store the enclosure response and/or other determined values (e.g. eigenvalue, S-matrix, etc.) for a plurality of excitation energy frequencies and tuning element settings. In some embodiments, if the CPA condition is lost or reduced, the process 500 may refer to the stored settings to facilitate reestablishing the CPA condition. In some embodiments, the systems and methods described herein may use multiple CPA conditions in the same bandwidth to provide power to the target 110, for example as described with FIG. 11. In some embodiments, the system 100 is linear and the CPA conditions can be super-imposed with no interference between them and no degradation of power transfer, which may lead to faster power delivery.

In some embodiments, the controller 102 may communicate with the target 110 to facilitate selecting the resolved frequency and resolved tuning element setting. For example, the target 110 may communicate to the controller 102 which frequency and tuning element setting provide the most energy to the target 110. In some embodiments, the process 500 may change from one CPA condition to another CPA condition over time, such that a plurality of CPA conditions are explored and corresponding information stored by the system 100. This stored information may be used to dynamically maintain the CPA condition as the scattering environment fluctuates.

In some embodiments, the choice of resolved frequency is limited by external factors, such as FCC regulations, interference with other communication electronics such as Wi-Fi, Bluetooth, cellular network, etc. In some embodiments, the magnitude may be selected such that the wave magnitudes from all ports are relatively on the same level. In some embodiments, there may be no preference as to selection of phase choices.

At 514, the process 500 can determine the eigenvector associated with the S-matrix having the zero or near-zero (e.g., within a tolerance) eigenvalue selected at 510. The associated eigenvector can provide the incident waveform configuration that leads to a CPA (or near-CPA) condition. The S-matrix and eigenvalue, and determined eigenvector, are associated with a particular excitation energy (e.g., frequency) and tuning element setting. The determined eigenvector then specifies the excitation wave amplitudes and phases at the ports 104 to create the CPA (or near-CPA) condition in the system 100.

At 516, the process 500 may apply the eigenvector to the resolved frequency at the ports 104, and the ports 104 should measure zero (or near-zero if using tolerance) excitation energy response from the enclosure 150. In some embodiments, the process 500 may apply the resolved tuning element setting to the one or more tuning elements 106. In some embodiments, the tuning element(s) 106 may already be set correctly from the search sub-process 502 to 510. In some embodiments, the process 500 at 516 may cause the ports 104 to generate EM radiation at the resolved EM frequency and with amplitudes and phases determined from the determined eigenvector. The ports 104 should then measure an approximately zero response to the EM excitation.

In some embodiments, the base amplitude of the excitation energy may be determined by how much power will be delivered to the enclosure 150 and/or target 110. The input eigenvector may determine the relative magnitude of the excitation energy. For example, in a particular system with particular properties and particular EM excitations, an example of an input eigenvector can be:

$$\Phi_{in} = \begin{pmatrix} 0.4953 e^{-i*28.43°} \\ 0.8687 \end{pmatrix}$$

wherein the numbers 0.4953 and 0.8687 refer to the voltage amplitudes. The power ratio setting on the two ports may comprise:

$$\frac{P_{in} \text{ at Port 1}}{P_{in} \text{ at Port 2}} = \left(\frac{0.4953}{0.8687}\right)^2$$

As in this example, the eigenvector in some embodiments may been normalized, i.e., $\sqrt{0.4953^2 + 0.8687^2} = 1$, which may facilitate setting the individual port powers based on the desired amount of power. In some embodiments, the relative phase difference between the two input signals is considered. In the particular example, the phase from the first port may be set to 0° while setting phase from the second port to be 28.43°. More generally, the phase from the first port may be set to x° (x can be any value) while setting the phase from the second port to be x+28.43°.

The response of the enclosure 150 to the excitation energy may change over time. Objects within the enclosure 150 may move, temperature fluctuations may cause expansion or contraction of the enclosure 150 or objects therein, material properties may change, and so on. Each of these changes may cause a change in the scattering properties of the enclosure 150. As discussed further below, small changes in the scattering properties may result in large deviations from the CPA condition.

In some embodiments, the process 500 may optionally repeat 502 through 516, for example to attempt to maintain a CPA or near-CPA condition in the enclosure 150. In some embodiments, the process 500 may repeat these steps at regular or irregular intervals. The intervals may be predetermined, for example, based on the expected degree of fluctuation of the scattering environment. In some embodiments, the interval may be set so the process 500 can update at kilohertz rates. In some embodiments, the interval may be based on the time the system 100 takes to perform all or part of process 500.

In some embodiments, the process 500 may optionally measure 518 the response of the enclosure 150 to the resolved frequency and resolved tuning element setting. In some embodiments, for example, the system 100 may measure the amount of received EM radiation at the ports 104 after applying 516 the resolved EM frequency (with applied amplitudes and phases) and resolved tuning element setting. This can be used to construct the quantity $P_{out}/P_{in}$ discussed above. In some embodiments, the ports 104 may measure the magnitude and phase of the reflected (scattered, etc.) EM radiation. In some embodiments, the process 500 may continue to monitor, at 518, the enclosure 150 response, for example at predetermined intervals. If the process 500 determines 520 that the received response indicates too far a deviation from the CPA or near-CPA condition, the process 500 may cause the system to perform the process 500 starting from 502 (or optionally from 512). For example, in some embodiments, the process 500 may reevaluate the CPA condition when $P_{out}/P_{in}$ exceeds a threshold value, such as $10^{-3}$ (as further described above). Otherwise, the process 500 at 520 may continue to allow and/or cause 516 the ports 104 to generate the excitation energy at the resolved frequency (with applied amplitudes and phase) with the resolved tuning element setting. In some embodiments, this process can be much faster than the time scale on which objects move or change in the enclosure 150.

In some embodiments, process 500 can receive feedback from one or more targets with an indication of an amount of power received by the target. For example, process 500 can receive feedback from a target indicating how much power is being transferred to the target under particular conditions (e.g., particular conditions that cause a zero eigenvalue in the S-matrix), and process 500 can determine which of multiple solutions to use based on the power transfer to the target(s) at each solution.

Figure 6:
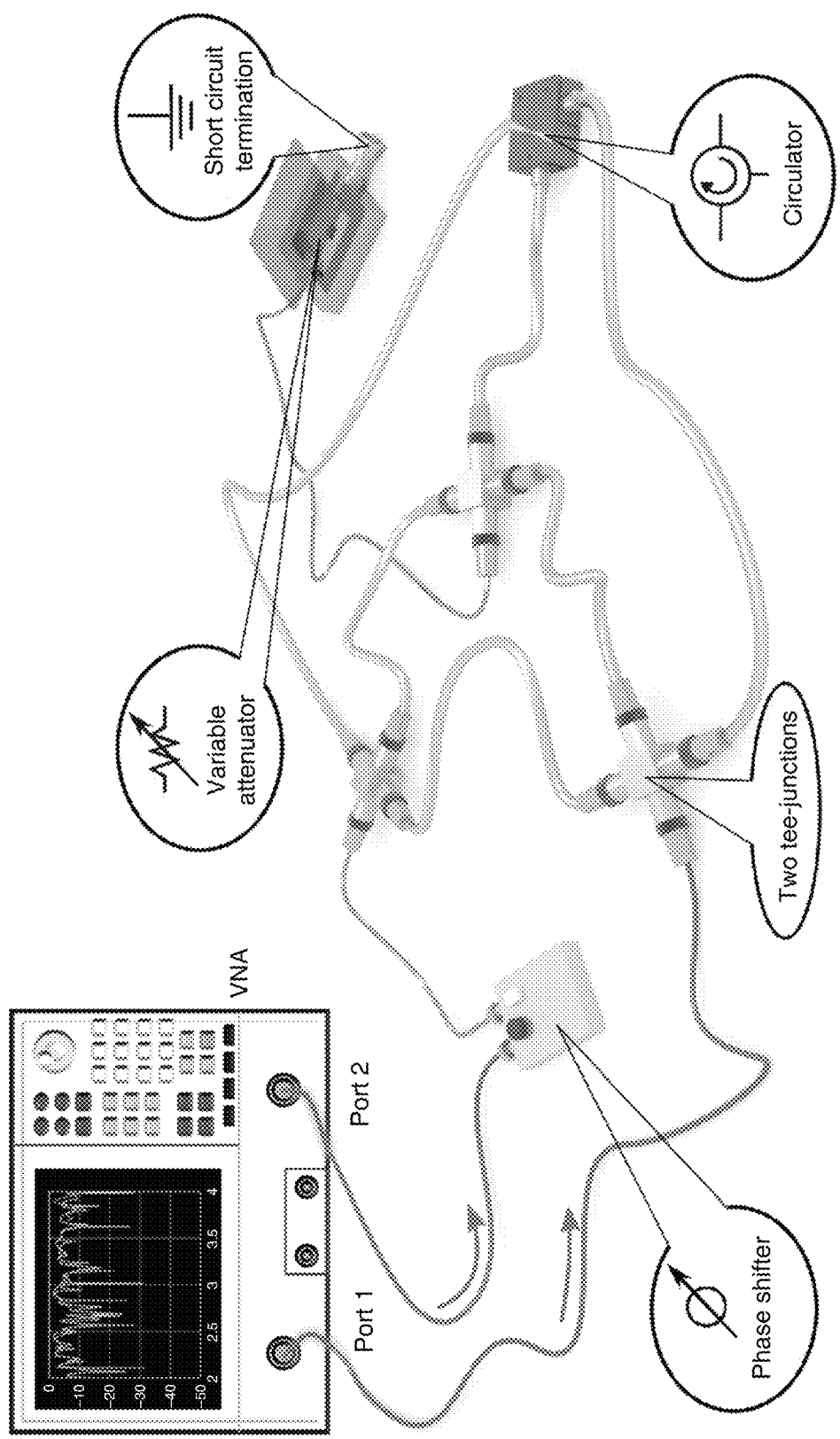
FIG. 6 shows an example implementation of a system for demonstrating the viability of long-range wireless power transfer in complex ray-chaotic environments in accordance with some embodiments of the disclosed subject matter.

Referring to FIG. 6, an experimental demonstration of coherent perfect absorption in a complex scattering system having no special symmetries. The experiment was implemented using a microwave graph constructed from coaxial cables connected by Tee-junctions. By adding a variable lossy attenuator into the system, the CPA frequencies were identified as the complex zeros of the scattering matrix which cross the real frequency axis and achieve perfect absorption in this complex scattering setting. The experimental setup further allowed demonstration that the concept of CPA can be extended beyond the cases where time-reversal symmetry holds, for example by introducing a circulator into the microwave graph. While the experiment was performed with microwaves, the results apply to all wave frameworks.

The variable attenuator may be attached to one internal node of the tetrahedral microwave graph. The system may be coupled to external transmission lines attached to N specific nodes of the graph. Each coupling transmission line (labeled with a curved arrow in FIG. 6) may be coaxial cable supporting a single propagating mode connecting to one port of a Vector Network Analyzer (VNA). The plane of calibration of the VNA is at the point where the transmission line attaches to the port of the graph. The experimental setup is completed with the addition of a phase shifter. The latter was used in a different experiment that launched appropriate CPA waveforms into the complex network (described below).

The 2×2 S-matrix of the graph was acquired using the setup of FIG. 6 (excluding the phase shifter and circulator). The measurement was taken from 10 MHz to 18 GHz which includes about 420 modes of the closed graph. The calibrated S-matrix of the 2-port graph is then measured under different attenuation settings ranging from 2 dB to 12 dB (which includes the insertion loss of the variable attenuator). Using a matrix diagonalization technique, the complex eigenvalues $\lambda_S$ of the S-matrix were found for each frequency and attenuator setting. A limited number of these eigenvalues will approach the origin in the complex $\lambda_S$ plane (see FIG. 7). These near-zero crossings were then examined in detail. The specific frequencies and attenuation values at the "zero-crossing" CPA state, as well as the required excitation relative magnitude and phase at the two ports (S-matrix eigenvector) were then determined.

A two-source VNA was used to apply excitation signals at the CPA frequency but with two different amplitudes. In addition, the phase shifter was added between port 2 of the network analyzer and the graph in order to deliver signals with an appropriate phase difference to the two ports of the graph. When signals are sent from both ports of the network analyzer simultaneously, it should be possible to observe the coherent perfect absorption, e.g., no microwave signals should emerge from the graph through either of the ports. The VNA measures both the outgoing and incoming waves at the plane of calibration, hence the CPA condition can be directly confirmed with this setup.

Referring to FIG. 8, under the CPA condition, a nearly perfect absorption was achieved, which was verified using four independent parametric sweep measurements. Both experimental and numerical data are plotted in the same graphs. Parameters swept include the microwave frequency (wavelength), attenuation of the variable attenuator embedded in the graph, amplitude of excitation signal at port 1, and phase of excitation signal at port 2, while keeping other settings unchanged at the CPA condition. The input wave power and outgoing wave power were directly measured while changing the system configuration or the input stimulus setting. The ratio of outgoing signal power over input signal power ($P_{out}/P_{in}$) acquired values as low as $10^{-5}$ at the CPA condition, and both experiment and simulation show similar behavior upon deviation from the CPA conditions. The results demonstrate that the minimum outgoing power is measured at the CPA condition, and rapidly increases in a cusp-like manner as any of the parameters deviate from that condition.

Figure 7:
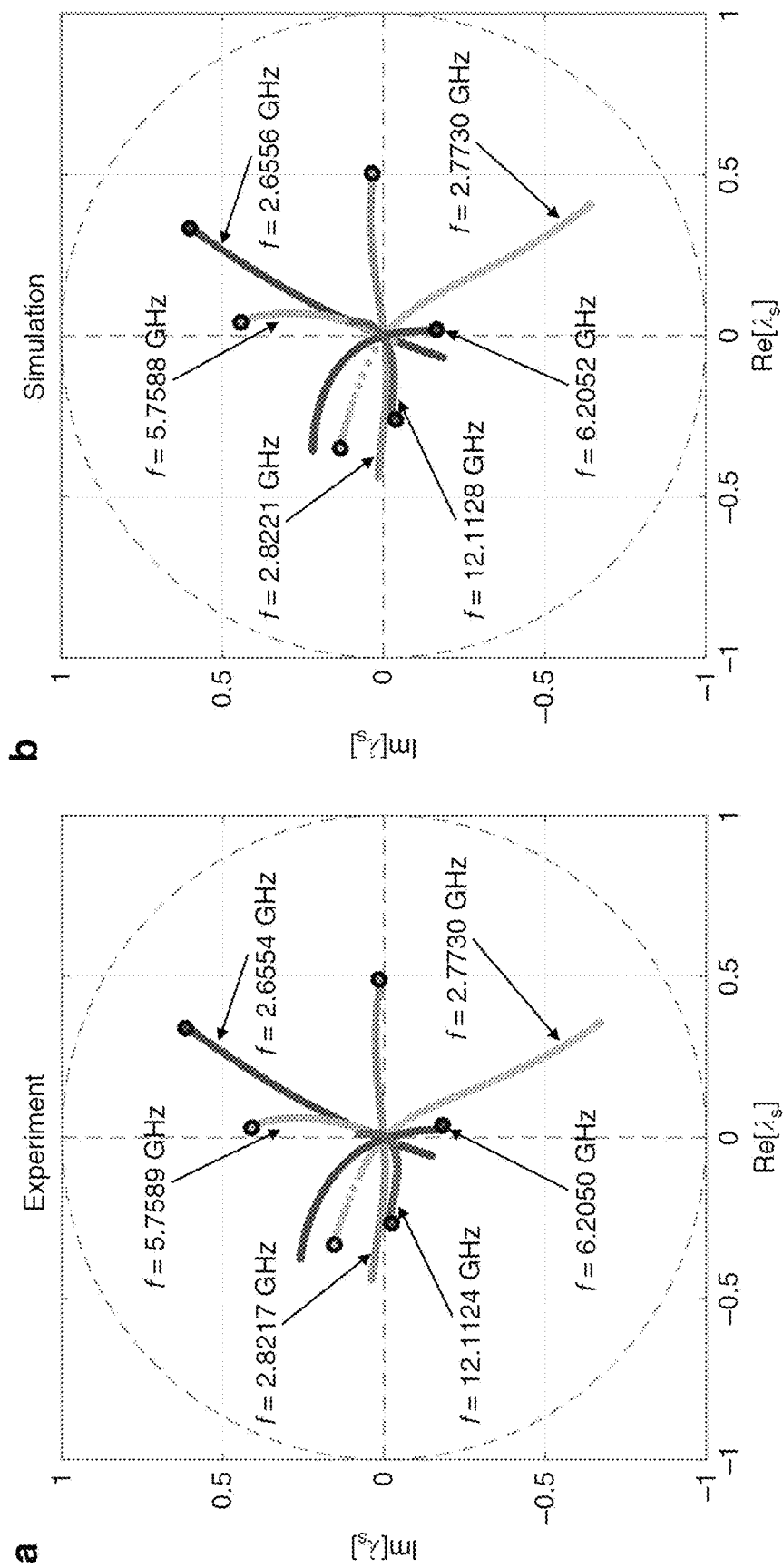
FIG. 7 shows examples of S-matrix eigenvalues generated with various parameter values using the system of FIG. 6 and a simulated system for demonstrating the viability of long-range wireless power transfer in complex ray-chaotic environments implemented in accordance with some embodiments of the disclosed subject matter.

Due to the extreme sensitivity to perturbations and internal system details, it is difficult to create a numerical model of a complex scattering system that reproduces all of its properties in detail. The numerical results in FIGS. 7, 8 and 10 are taken from a simplified model that approximates the measured graph but captures certain properties of all complex scattering systems. The model demonstrates that the CPA results are applicable to many complex scattering systems A reverberant cavity was compared to a "bare" attenuator only. The power ratio of the "bare" attenuator (see inset in FIG. 8, panel (b)) was measured under the same settings as in the complex networks. In the absence of the graph (complex scattering environment), the attenuator only absorbed a small fraction of the incident power ($P_{out}/P_{in} > 10^{-1}$). The complex scattering environment facilitated the CPA condition.

The contribution to the total power absorption from different elements in this setup, as well as the reverberation effect inside the graph under CPA condition, were investigated using the simulation model shown in FIG. 9A. FIG. 9B shows that the voltage amplitudes at the four nodes in the graph under CPA condition were roughly equal. As shown in FIG. 9C, most of the power was absorbed by the variable attenuator, and the rest was absorbed by the coaxial cables, which contributed to a spatially-uniform absorption inside the system. There was very little reactive power in the graph under the CPA condition, as opposed to the "Anti-CPA" state where a large amount of reactive power circulates in the system. FIGS. 9A to 9C demonstrate that CPA is the combined effect of localized loss and wave interferences, providing a destructive interferometric trap for the incident radiation.

Referring to FIG. 11, a further experimental demonstration of coherent perfect absorption in a complex scattering system was performed. A two-dimensional quarter bow-tie billiard cavity was used, shown in the inset of FIG. 11. Such cavities demonstrate chaotic dynamics in the classical (ray) limit and are used as an archetype system for wave chaos. The tuning element is embodied by local losses comprising a voltage variable attenuator located at the dot position in the inset. Two ports on the top plate of the bow-tie billiard are used for measurement. Using the same experimental procedure described above, CPA conditions were identified and the corresponding CPA waveform was injected into the cavity. Due to higher mode density in two-dimensional billiards, two zeros $\lambda(\omega_1)=\lambda(\omega_2)=0$ existed at the same attenuation strength but at two different frequencies. As these frequencies (keeping the attenuation parameter fixed), the system supports two different CPA waveforms identified by two different eigenvectors of the S-matrix. FIG. 11 shows the response of injection of these waveforms into the cavity and the measured corresponding output power versus frequency for a fixed attenuation. At the CPA frequencies, the output power associated with the two distinct waveforms drops sharply. FIG. 11 also shows the scale bar of the mean mode spacing $\Delta$. In some embodiments, the mechanisms described herein can be used as a fast tunable switch where incident monochromatic radiation from one port of the cavity is interferometrically suppressed by a control signal that is injected from the other port.

After investigating the coherent perfect absorption property of the time-reversal invariant (TRI) tetrahedral microwave graph, a graph with broken TRI (BTRI) was investigated. A circulator was added at one internal node of the graph (see FIG. 6), which turned the TRI graph into a BTRI graph. Following the procedures described above, the CPA conditions were determined by solving for the eigenvalues of the S-matrix. After that, similar sweep measurements were done as in the TRI case to directly verify the coherent perfect absorption in the BTRI graph. The results in FIG. 10 from both experiment and simulation show similar CPA behavior as observed in the TRI case. This demonstrates the CPA may be used in BTRI settings as well, using the systems and methods described herein. By introducing the non-reciprocal element (circulator) into the system, one would expect that the broken-TRI should weaken the coherence between incident waves. However, the results shown here demonstrate the applicability of CPA even to BTRI systems.

In some embodiments, the systems, methods, and media described herein may use the same bandwidth to perform other tasks (e.g., information transfer) utilizing the "Anti-CPA" condition. This may alleviate frequency crowding concerns. In some embodiments, the Absorption matrix $A \equiv 1-S^\dagger S$ was used to analyze the "Anti-CPA" state. Absorption matrix A may be a Hermitian, positive semi-definite operator. The magnitude of its eigenvalues $\alpha$ span the interval [0,1] and the corresponding eigenvectors $|\alpha\rangle$ are orthogonal. The eigenvector associated with the eigenvalue $\alpha_{max}=1$ is the CPA excitation energy from the analysis of the zeroes of the S-matrix (described above). The components of the eigenvector which is associated with the minimum eigenvalue $\alpha_{min}$ provides the information about the incident waveform which will lead to minimal absorption. Such a scattering field may be referred to as the "Anti-CPA" state. The extreme case of $\alpha=0$ may be associated with a scattering field that avoids completely a node where the tuning element is located. Under this condition, the total power absorbed may be small, and the power absorbed by the tuning element may be smaller (in some cases nearly no power is absorbed by the tuning element). A large amount of reactive power may be present in the system 100 under this condition.

In some embodiments, the systems, methods, and media described herein may use the CPA condition as a switch for an arbitrary incident signal at one frequency. For a given waveform incident through the ports of the system 100 one can arrange the relative amplitude/phase of a control wave injected into the enclosure 150 to create complete absorption of an incident signal at the same frequency. Switching back and forth between the CPA and anti-CPA control waves will toggle the incident signal to a maximum extent.

As discussed above, in some embodiments, establishing the CPA condition can create a situation in which the reflected power from the enclosure 150 is sensitive to a number of different possible disturbances to the system 100. There may be a sensitive change in absorbed energy, or output power from a complex scattering system, due to any perturbation of the system from CPA condition. In some embodiments, the system 100 may use these disturbances to detect or otherwise determine motion of an object anywhere in the enclosure 150.

In some embodiments, the systems, methods, and media described above may be used for secure communication. In some such embodiments, the target may be a receiver embedded at an unknown location in a complex environment. The target may comprise a tuning element 106, which may comprise an absorber. Due to the complexity of the environment (sensitive interference), transfer of information from an outside source may occur only if the emitter (e.g. ports 104) prepares and injects a very specific waveform. The waveform may be determined by the target property as well as the environment information, and may be rapidly altered as soon as the target changes its property. The CPA conditions—tuning element setting (e.g. absorption) and frequency—can be utilized to create a unique "key" to encrypt the communication and secure the transmission process. One can establish a secure communication protocol between the controller 102 and the target 110.

Note that, although the mechanisms described herein are described in connection with microwave, the mechanisms can be used in other applications, such as with EM radiation of a different spectrum, pressure waves (e.g., acoustic), vibration, quantum, and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE- PROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It will be appreciated by those skilled in the art that while the disclosed subject matter has been described above in connection with particular embodiments and examples, the present disclosure and the claims of the present disclosure are not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the various aspects presented in the present disclosure are set forth in the following claims.

The invention claimed is:

1. A device for wireless power transfer to a target in an enclosure, the enclosure having a tuning element and a plurality of ports, the device comprising:
   a processor communicatively coupled with the tuning element and the plurality of ports, the processor configured to:
      (a) cause the ports to generate an electromagnetic radiation at a first frequency;
      (b) set the tuning element to a first setting;
      (c) acquire an electromagnetic response from the plurality of ports;
      (d) determine an S-matrix using the acquired electromagnetic response;
      (e) determine an eigenvalue of the S-matrix;
      (f) repeat (a) to (e) at least until the determined eigenvalue is approximately zero, wherein repeating (a) to (e) comprises changing at least one of the first frequency or first setting;
      (g) determine a resolved electromagnetic radiation frequency and a resolved tuning element setting having the approximately zero eigenvalue;
      (h) determine an eigenvector associated with the resolved electromagnetic radiation frequency and a resolved tuning element setting; and
      (i) cause the ports to generate the electromagnetic radiation at the resolved frequency with a phase and an amplitude determined from the eigenvector.

2. The wireless power transfer device of claim 1, wherein the electromagnetic radiation generated by the ports comprises microwave.

3. The wireless power transfer device of claim 1, wherein the processor is further configured to repeat (a) to (i) at a regular interval.

4. The wireless power transfer device of claim 1, wherein the processor is further configured to:
   determine a received amount of electromagnetic radiation after setting the tuning element to the resolved tuning element setting and causing the ports to generate the electromagnetic radiation at the resolved frequency; and
   repeat (a) to (i) upon a condition wherein the received amount of electromagnetic radiation is greater than a threshold.

5. The wireless power transfer device of claim 1, wherein the tuning element comprises a reconfigurable metasurface.

6. The wireless power transfer device of claim 1, wherein:
   the target comprises an antenna configured to receive the electromagnetic radiation; and
   the target is configured to convert the received electromagnetic radiation into electrical current.

7. The wireless power transfer device of claim 6, wherein the tuning element comprises a tunable lossy element coupled with the antenna.

8. The wireless power transfer device of claim 1, wherein the target comprises the tuning element, and the processor is configured to:
   communicatively couple with the target; and
   provide the first setting to the target.

9. A method for wireless power transfer to a target in an enclosure, the enclosure having a tuning element and a plurality of ports, the method comprising:
   (a) causing the ports to generate an electromagnetic radiation at a first frequency;
   (b) setting the tuning element to a first setting;
   (c) acquiring an electromagnetic response from the plurality of ports;
   (d) determining an S-matrix using the acquired electromagnetic response;
   (e) determining an eigenvalue of the S-matrix;
   (f) repeating (a) to (e) at least until the determined eigenvalue is approximately zero, wherein repeating (a) to (e) comprises changing at least one of the first frequency or first setting;
   (g) determining a resolved electromagnetic radiation frequency and a resolved tuning element setting having the approximately zero eigenvalue;
   (h) determining an eigenvector associated with the resolved electromagnetic radiation frequency and a resolved tuning element setting; and
   (i) causing the ports to generate the electromagnetic radiation at the resolved frequency with a phase and an amplitude determined from the eigenvector.

10. The wireless power transfer method of claim 9, wherein the electromagnetic radiation generated by the ports comprises microwave.

11. The wireless power transfer method of claim 9, wherein the method further comprises repeating (a) to (i) at a regular interval.

12. The wireless power transfer method of claim 9, wherein the method further comprises:
   determining a received amount of electromagnetic radiation after setting the tuning element to the resolved tuning element setting and causing the ports to generate the electromagnetic radiation at the resolved frequency; and
   repeating (a) to (i) upon a condition wherein the received amount of electromagnetic radiation is greater than a threshold.

13. The wireless power transfer method of claim 9, wherein the tuning element comprises a reconfigurable metasurface.

14. The wireless power transfer method of claim 9, wherein the target comprises the tuning element, and the method further comprises:
   communicatively coupling with the target; and
   providing the first setting to the target.

15. A non-transitory computer-readable medium containing computer executable instructions that, when executed by a processor, cause the processor to perform a method for wireless power transfer to a target in an enclosure, the enclosure having a tuning element and a plurality of ports, the method comprising:
  (a) causing the ports to generate an electromagnetic radiation at a first frequency;
  (b) setting the tuning element to a first setting;
  (c) acquiring an electromagnetic response from the plurality of ports;
  (d) determining an S-matrix using the acquired electromagnetic response;
  (e) determining an eigenvalue of the S-matrix;
  (f) repeating (a) to (e) at least until the determined eigenvalue is approximately zero, wherein repeating (a) to (e) comprises changing at least one of the first frequency or first setting;
  (g) determining a resolved electromagnetic radiation frequency and a resolved tuning element setting having the approximately zero eigenvalue;
  (h) determining an eigenvector associated with the resolved electromagnetic radiation frequency and a resolved tuning element setting; and
  (i) causing the ports to generate the electromagnetic radiation at the resolved frequency with a phase and an amplitude determined from the eigenvector.

16. The non-transitory computer-readable medium of claim 15, wherein the electromagnetic radiation generated by the ports comprises microwave.

17. The non-transitory computer-readable medium of claim 15, wherein the method further comprises repeating (a) to (i) at a regular interval.

18. The non-transitory computer-readable medium of claim 15, wherein the method further comprises:
  determining a received amount of electromagnetic radiation after setting the tuning element to the resolved tuning element setting and causing the ports to generate the electromagnetic radiation at the resolved frequency; and
  repeating (a) to (i) upon a condition wherein the received amount of electromagnetic radiation is greater than a threshold.

19. The non-transitory computer-readable medium of claim 15, wherein the tuning element comprises a reconfigurable metasurface.

20. The non-transitory computer-readable medium of claim 15, wherein the target comprises the tuning element, and the method further comprises:
  communicatively coupling with the target; and
  providing the first setting to the target.

* * * * *